(12) United States Patent
Fromovich

(10) Patent No.: US 11,918,436 B2
(45) Date of Patent: Mar. 5, 2024

(54) DENTAL IMPLANT SYSTEM

(71) Applicant: STRAUMANN HOLDING AG, Basel (CH)

(72) Inventor: Ophir Fromovich, Moshav Adanim (IL)

(73) Assignee: STRAUMANN HOLDING AG, Basel (CH)

( * ) Notice: Subject to any disclaimer, the term of this patent is extended or adjusted under 35 U.S.C. 154(b) by 528 days.

(21) Appl. No.: 16/610,704

(22) PCT Filed: May 2, 2018

(86) PCT No.: PCT/IB2018/053035
§ 371 (c)(1),
(2) Date: Nov. 4, 2019

(87) PCT Pub. No.: WO2018/203247
PCT Pub. Date: Nov. 8, 2018

(65) Prior Publication Data
US 2020/0146786 A1    May 14, 2020

(30) Foreign Application Priority Data

May 2, 2017   (EP) ..................................... 17169130

(51) Int. Cl.
*A61C 8/00*   (2006.01)

(52) U.S. Cl.
CPC .......... *A61C 8/0066* (2013.01); *A61C 8/0022* (2013.01); *A61C 8/0037* (2013.01);
(Continued)

(58) Field of Classification Search
CPC ..... A61C 8/0048; A61C 8/005; A61C 8/0056; A61C 8/006; A61C 8/0066; A61C 8/0068;
(Continued)

(56) References Cited

U.S. PATENT DOCUMENTS

2002/0110784 A1   8/2002   Kumar
2002/0142265 A1*  10/2002  Weissman ............ A61C 8/0089
                                                        433/173
(Continued)

FOREIGN PATENT DOCUMENTS

CN   101252891 A     8/2008
CN   101730511 A  *  6/2010  ............. A61C 13/26
(Continued)

OTHER PUBLICATIONS

Dec. 10, 2020 Office Action issued in European Patent Application No. 18 722 220.3.
(Continued)

*Primary Examiner* — Matthew M Nelson
(74) *Attorney, Agent, or Firm* — Oliff PLC

(57) ABSTRACT

A dental implant having a substantially cylindrical shape with a longitudinal axis defining a longitudinal direction, including: a coronal section including a coronal end of the implant; a threaded region extending apically from the coronal section to an apical tip of the implant; and an internal blind bore for connection to a secondary part, including: a stabilizing section extending apically from the coronal end; and a drive and indexing section which extends apically from an apical end of the stabilizing section, which includes a plurality of connecting lobes having a concave shape and extending in the longitudinal direction, being interconnected by respective lobe linking areas, including: two convex sections extending in the longitudinal direction and adjacent to a respective connecting lobe; and a concave section extending in the longitudinal direction between the two convex sections. Further, a secondary part and an insertion tool of a configuration matching the dental implant.

42 Claims, 16 Drawing Sheets

(52) U.S. Cl.
CPC .......... *A61C 8/0054* (2013.01); *A61C 8/0068* (2013.01); *A61C 8/0089* (2013.01)

(58) Field of Classification Search
CPC ..... A61C 8/0069; A61C 8/022; A61C 8/0089; A61C 8/009; A61C 8/0092
USPC .......................................................... 433/174
See application file for complete search history.

(56) References Cited

U.S. PATENT DOCUMENTS

| | | | |
|---|---|---|---|
| 2005/0287496 A1 | 12/2005 | Niznick | |
| 2005/0287497 A1* | 12/2005 | Carter ................. | A61C 8/0069 433/173 |
| 2007/0037121 A1* | 2/2007 | Carter ................. | A61C 8/0089 433/173 |
| 2007/0037123 A1* | 2/2007 | Mansueto ............ | A61C 8/0022 433/173 |
| 2011/0117522 A1* | 5/2011 | Verma ................. | A61C 8/0022 433/174 |
| 2014/0186795 A1* | 7/2014 | Huang ................. | A61C 8/0089 433/141 |
| 2014/0200620 A1* | 7/2014 | Yahav ................. | A61C 8/0018 606/315 |
| 2017/0065377 A1* | 3/2017 | Hall ...................... | A61C 8/0078 |
| 2017/0086952 A1* | 3/2017 | Aravena ............ | A61C 13/0004 |
| 2019/0008614 A1* | 1/2019 | Weitzel ................ | A61C 8/0039 |

FOREIGN PATENT DOCUMENTS

| | | | | |
|---|---|---|---|---|
| CN | 105636548 A | | 6/2016 | |
| CN | 106232053 A | | 12/2016 | |
| CN | 105283147 B | * | 10/2019 | ........... A61C 8/0018 |
| EP | 1139906 A1 | | 10/2001 | |
| EP | 2407121 A1 | | 1/2012 | |
| ES | 2611760 A1 | * | 5/2017 | ........... A61C 13/225 |
| JP | 2003-052720 A | | 2/2003 | |
| JP | 2006075427 A | * | 3/2006 | ........... A61C 8/0066 |
| JP | 2008-504883 A | | 2/2008 | |
| JP | 2015-084796 A | | 5/2015 | |
| JP | 2015-204887 A | | 11/2015 | |
| JP | 2016-523626 A | | 8/2016 | |
| KR | 10-2007-0024664 A | | 3/2007 | |
| WO | 2006/012273 A1 | | 2/2006 | |
| WO | WO-2006109176 A1 | * | 10/2006 | ............. A61C 8/005 |
| WO | 2014/198681 A1 | | 12/2014 | |
| WO | 2015/118543 A1 | | 8/2015 | |
| WO | WO-2017010711 A1 | * | 1/2017 | ........... A61C 13/265 |

OTHER PUBLICATIONS

Aug. 4, 2017 Search Report issued in European Patent Application No. 17 16 9130.
Jun. 11, 2018 International Search Report issued in International Patent Application No. PCT/IB2018/053035.
Jun. 11, 2018 Written Opinion of the International Searching Authority issued in International Patent Application No. PCT/IB2018/053035.
Dec. 3, 2021 Office Action issued in Chinese Patent Application No. 201880028913.0.
Apr. 27, 2022 Office Action issued in Brazilian Patent Application No. BR112019022823-3.
Jan. 5, 2023 Office Action issued in Korean Patent Application No. 10-2019-7031637.
Oct. 23, 2022 Office Action issued in Israeli Patent Application No. 270258.
Oct. 27, 2022 Office Action issued in European Patent Application No. 18722220.3.
Nov. 22, 2022 Office Action issued in Japanese Patent Application No. 2019-560186.
Aug. 28, 2023 Office Action issued in Korean Patent Application No. 10-2019-7031637.

* cited by examiner

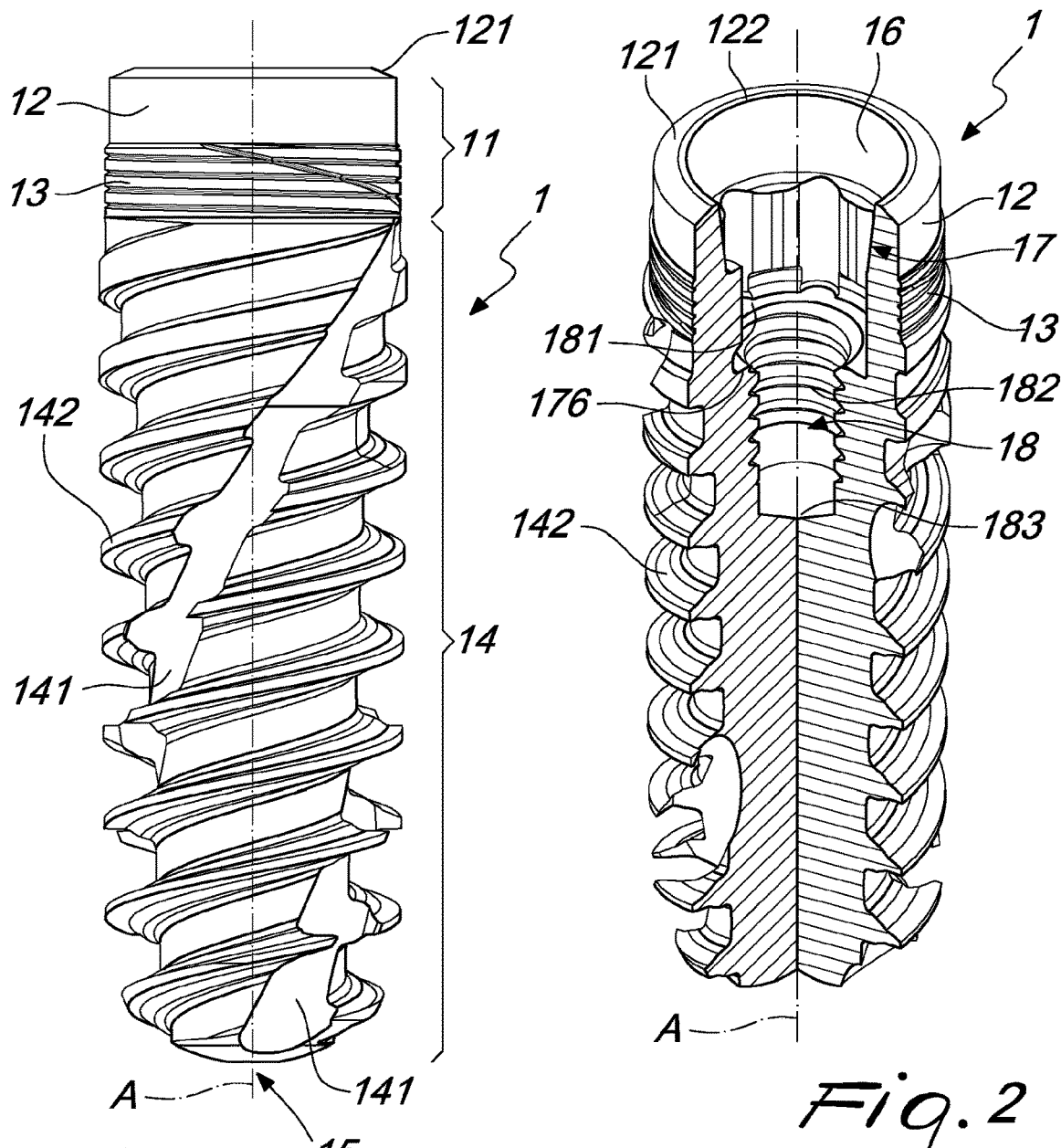
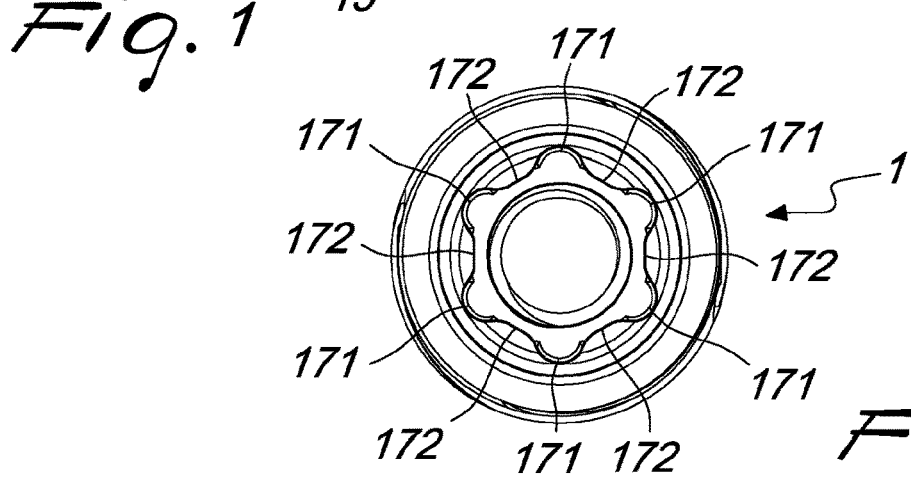
Fig.1    Fig.2    Fig.3

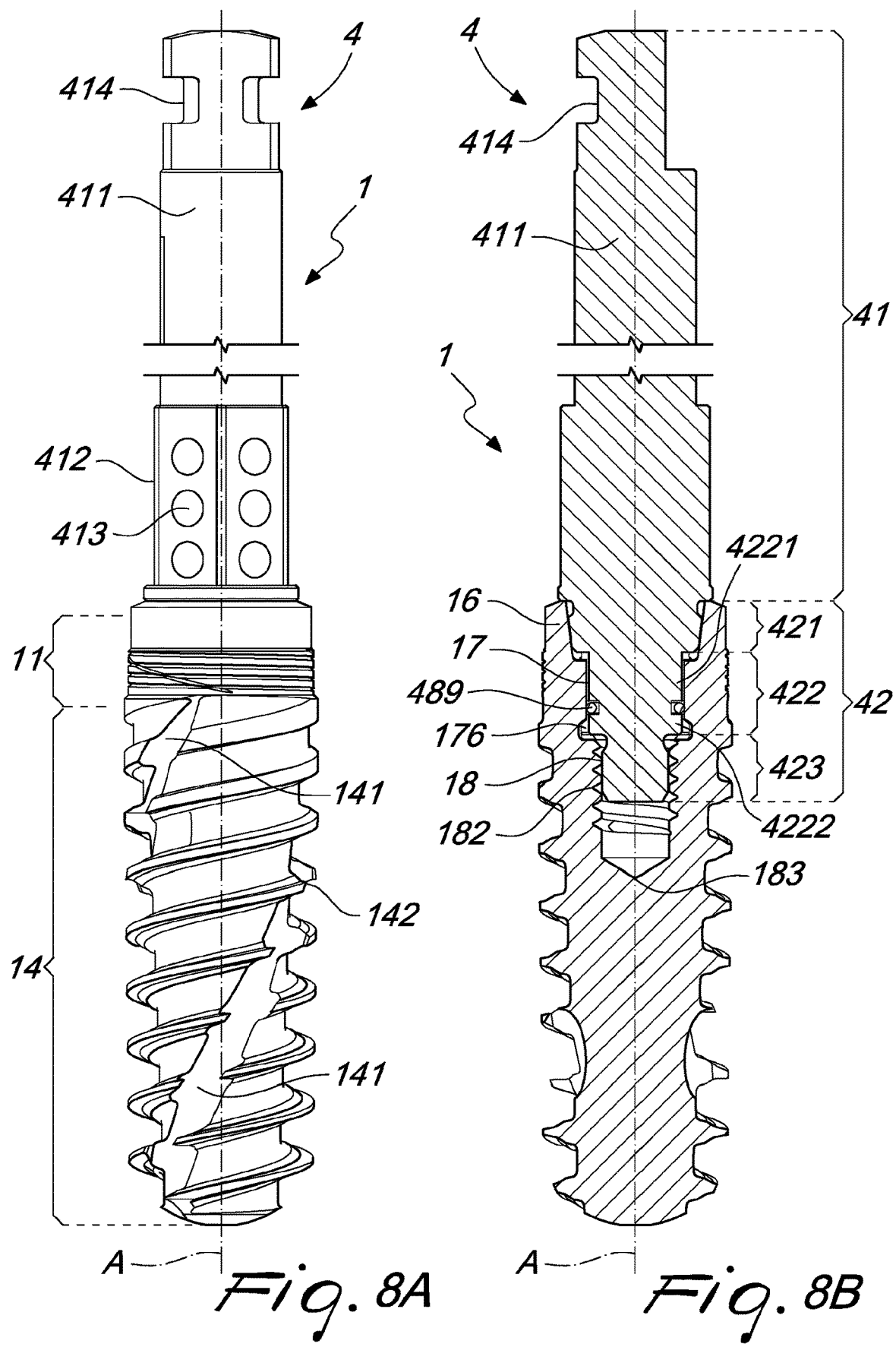

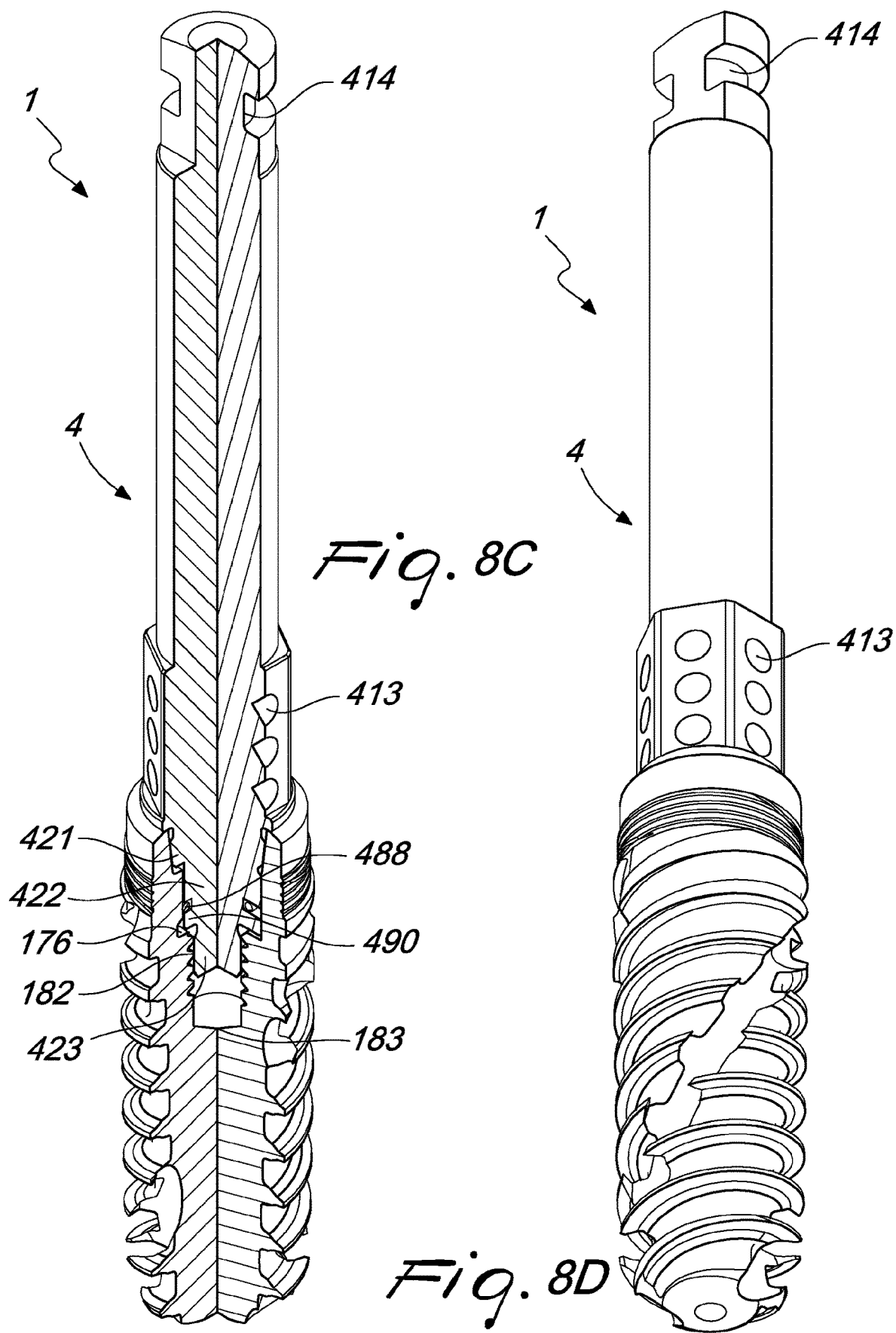

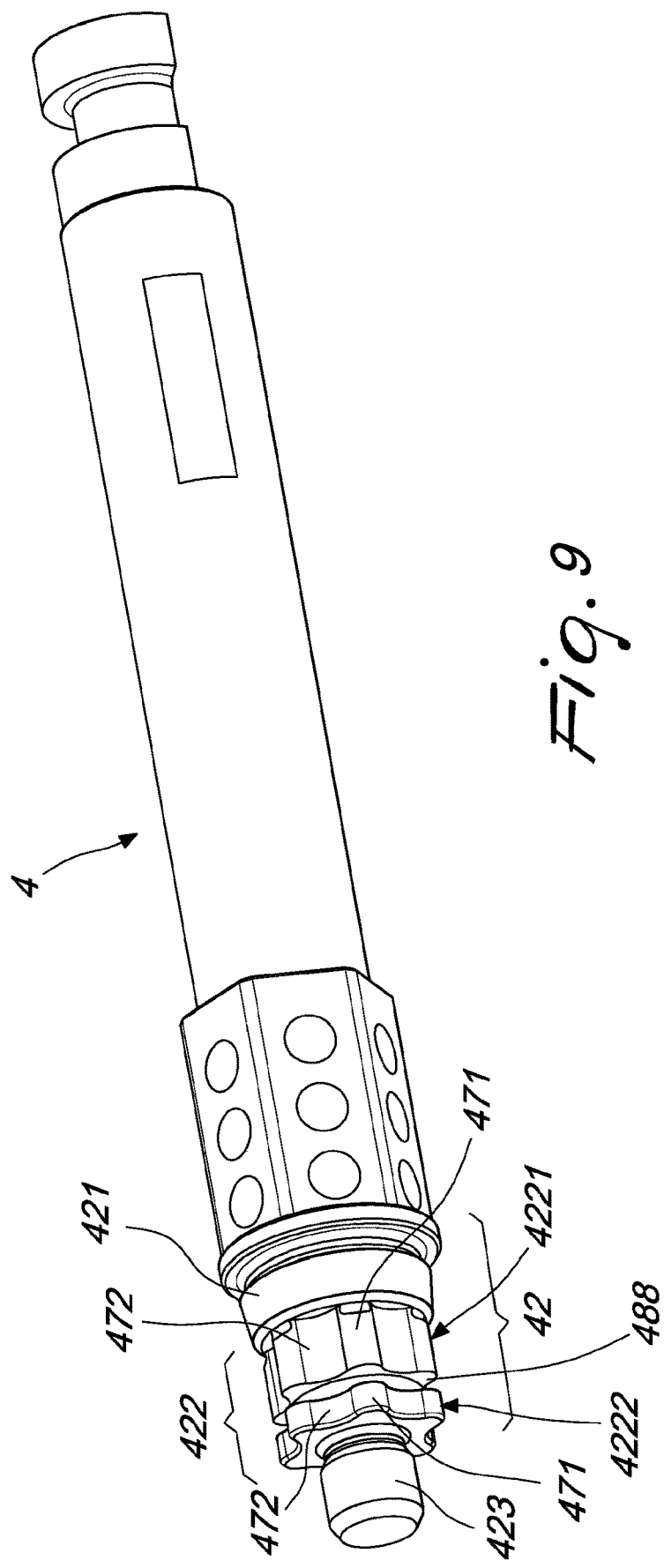

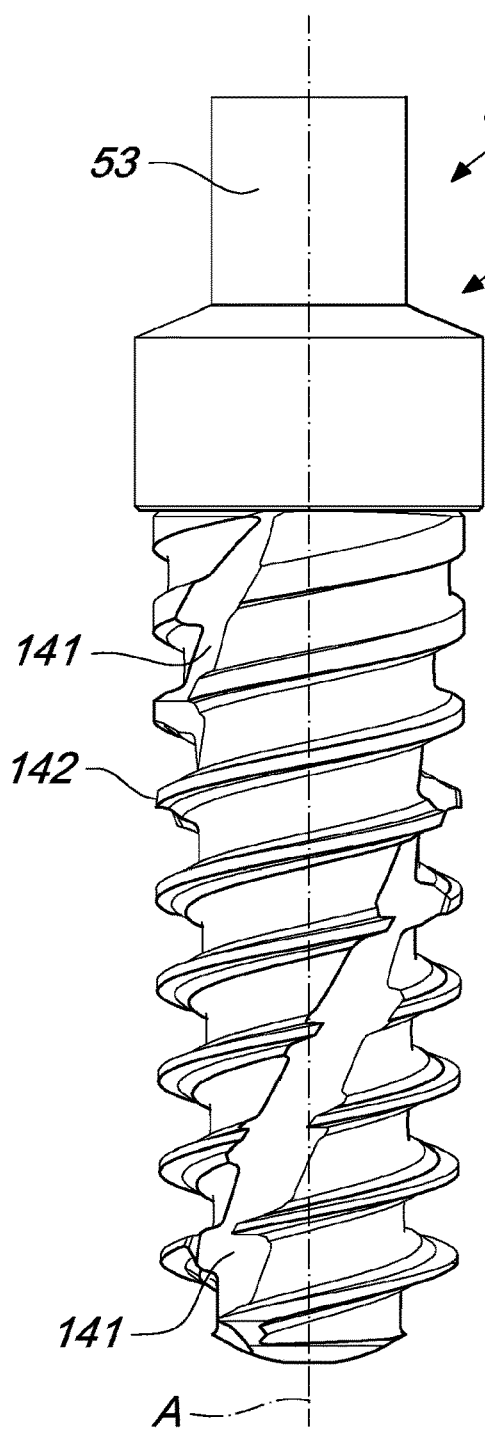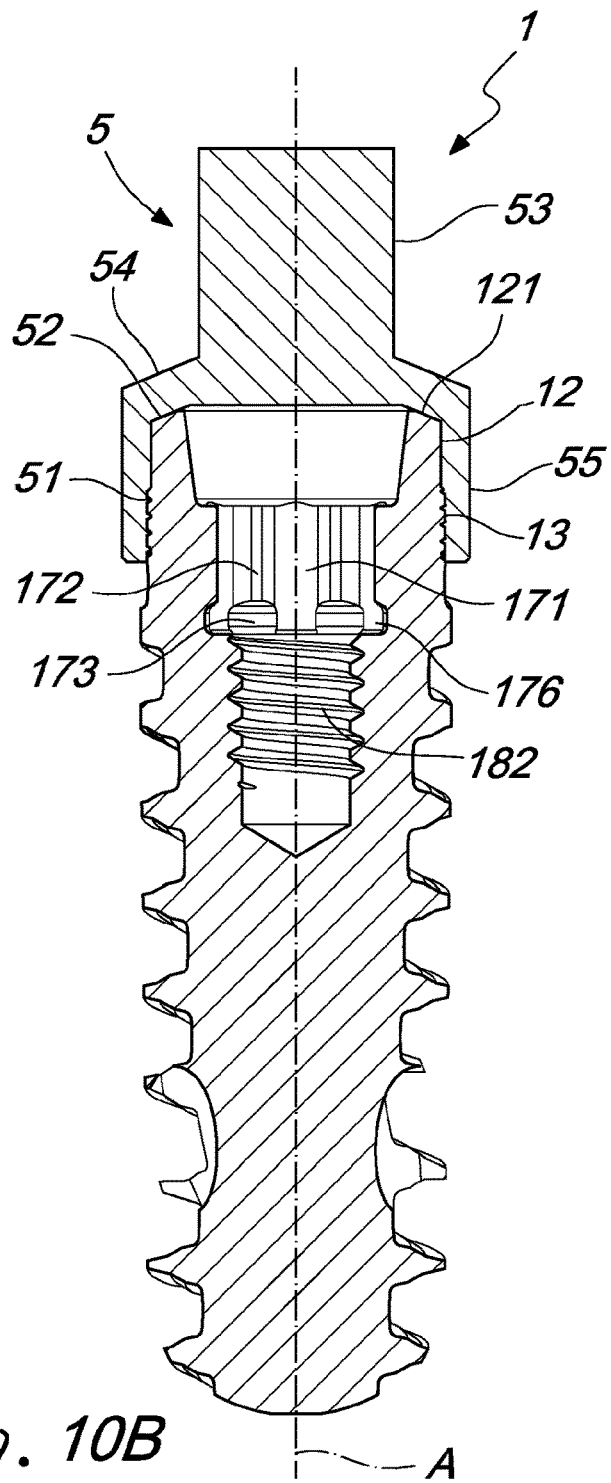
Fig. 10A
Fig. 10B

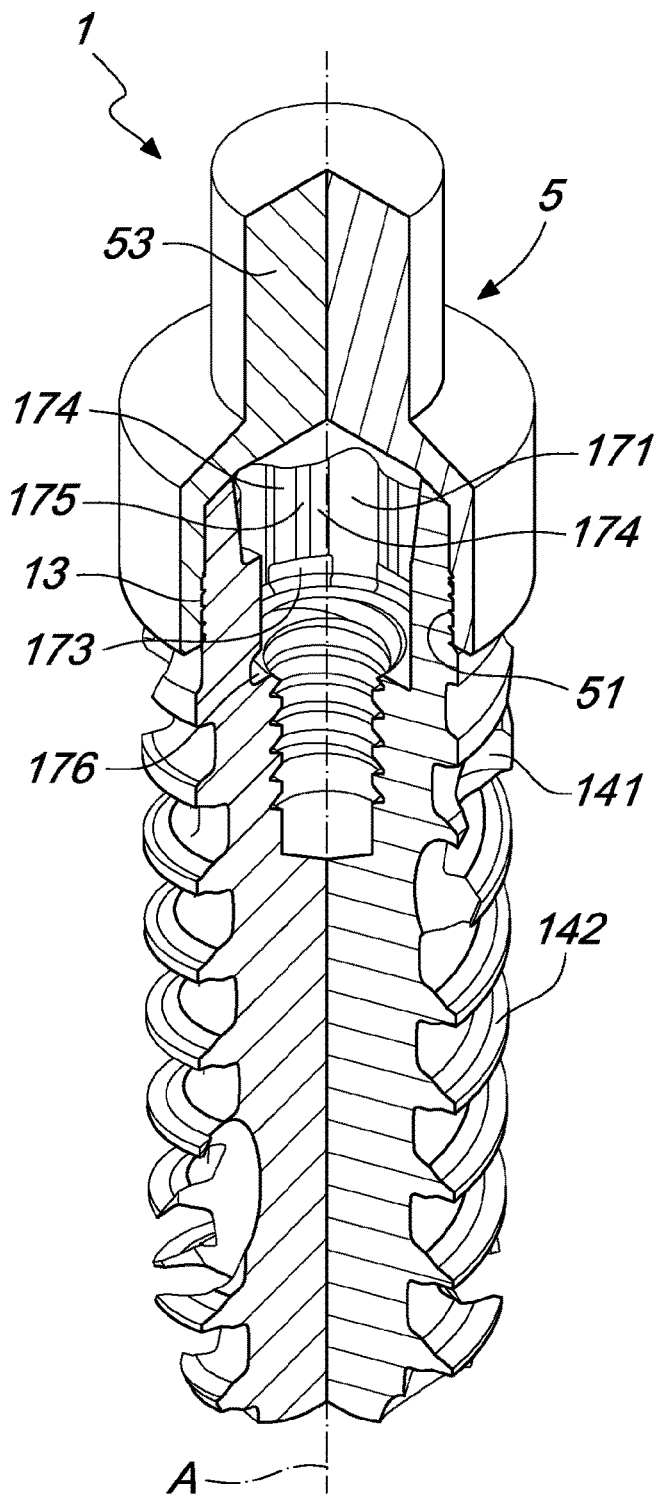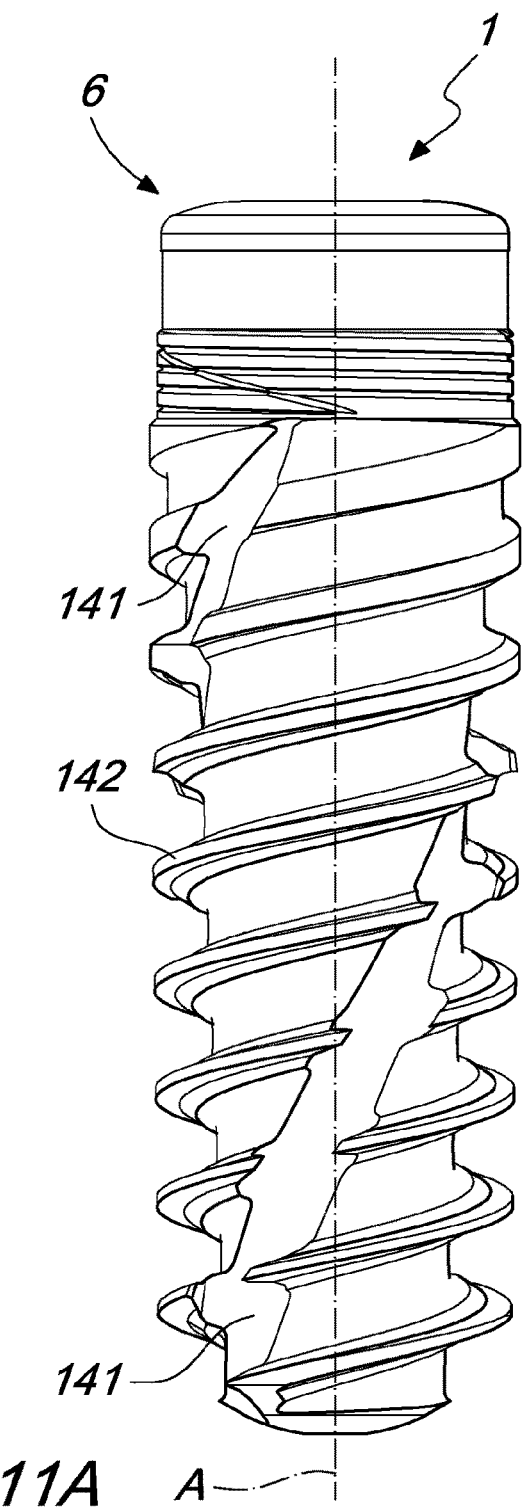
Fig. 10C
Fig. 11A

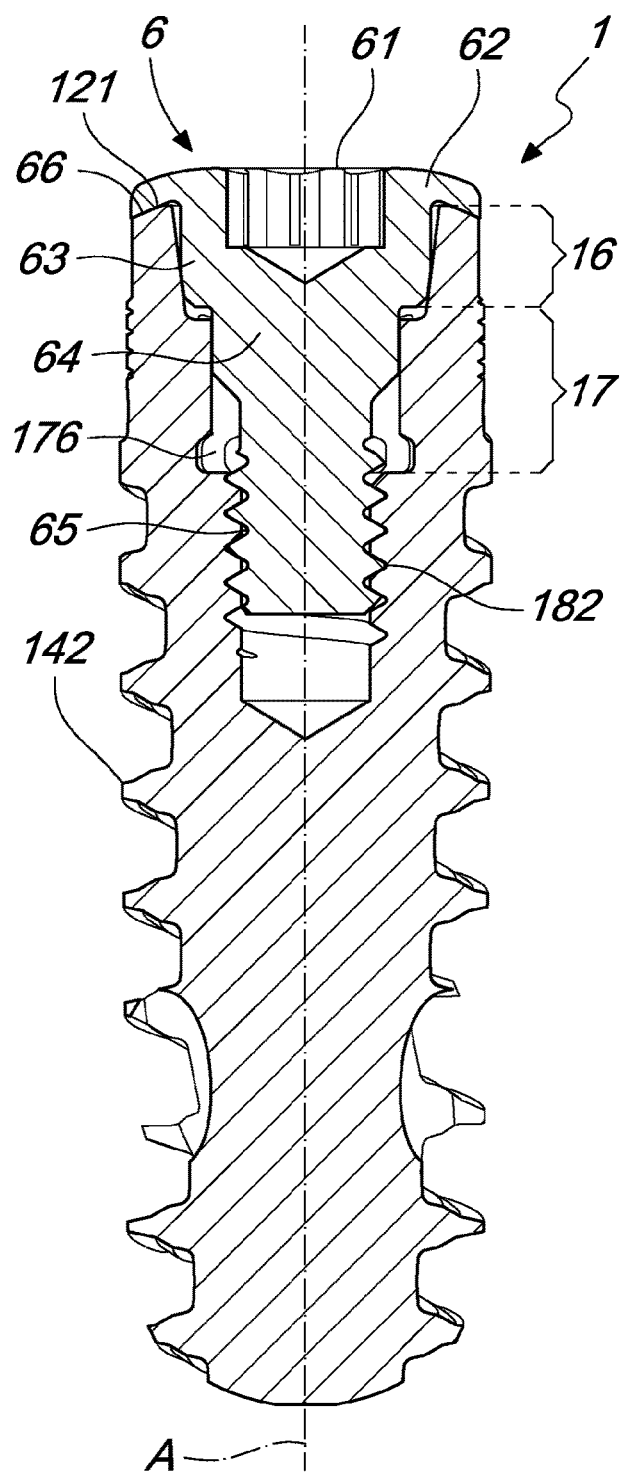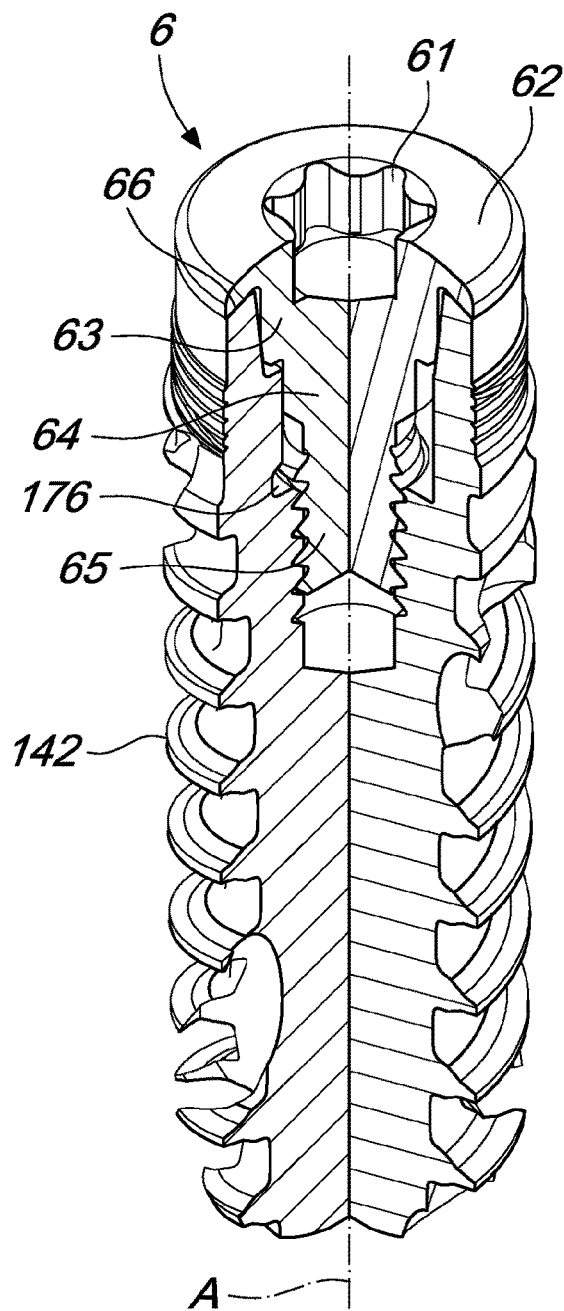
Fig. 11B
Fig. 11C

DENTAL IMPLANT SYSTEM

FIELD OF THE INVENTION

The present invention relates in general to a dental implant with an improved coupling for an insertion tool and/or for a secondary part and/or any other superimposed element, such as, for instance, an abutment, superimposed on the dental implant. The present invention also relates to a secondary part, such as, for instance, an abutment, with an improved coupling to a dental implant. Moreover, the present invention also relates to an insertion tool with an improved coupling to a dental implant. In addition, the present invention also relates to a dental implant system, in particular a multi-part dental implant system with an improved coupling between a dental implant and a secondary part, such as, for instance, an abutment, wherein the coupling is also suitable for cooperating with an insertion tool intended to place the dental implant in a receiving bone.

BACKGROUND OF THE INVENTION

Generally, multi-part dental implant systems are used in dental surgery to reconstruct dental parts of a human being. Usually, a multi-part implant system is comprised of a dental implant, preferably a dental screw, which is inserted by screwing or pressing into a receiving bore which has been prepared e.g. in the bone tissue, and of an abutment or a secondary part which can be attached to an internal blind bore of the dental implant. The abutment or secondary part is adapted, inter alia, to support a dental prosthesis or a dental bridge. The attachment of the abutment or of the secondary part to the dental implant is achieved by means of a connection screw which is threadingly fixed to an internal thread of the internal blind bore of the dental implant.

A dental implant system including a dental implant, in particular a dental implant screw, a secondary part (namely an abutment) and a connection screw are known from US 2005/0287497 A1. The internal blind bore of the known dental implant includes a stabilizing section which extends from a coronal end of the dental implant, a drive and indexing section which extends apically from the apical end of the stabilizing section and an internal threaded section extending apically from the apical end of the drive and indexing section. The known drive and indexing section is formed of a plurality of alternating equally dimensioned lobes with concave sections interposed between convex sections, such that a flower-like configuration is implemented. The abutment of the known dental implant system of US 2005/0287497 A1 is shaped at its apical end in a manner which is complementary to the stabilizing section and to the drive and indexing section of the dental implant and further has a through bore allowing the connection screw to pass therethrough for engaging the internal threaded section of the blind bore of the dental implant and holding the abutment fixed in a determined angular position on the dental implant.

A frequent problem arising with the above-described multi-part dental implant systems is the difficulty of correct angular positioning and stability of the abutment or of the secondary part within the dental implant which has already been placed in the bone tissue. Further, as the same coupling means are used to position the secondary part on the dental implant and to couple the same to an insertion instrument which is used to place the dental implant in the bone tissue, the problem of sufficient torque resistance of the coupling means arises. Yet another problem arising in multi-part dental implant systems is the sealing between the dental implant and the secondary part, as for the sake of sterility, the penetration of fluid into the internal blind bore of the dental implant via the coupling means should be minimized.

In US 2005/0287497 A1 the problem of correct angular positioning of the secondary part on the dental implant was addressed by devising an internal connection of the dental implant and the secondary part (namely an abutment) in which the dental implant includes the above-mentioned lobed configuration for installing the secondary part and a beveled surface positioned on the proximal side of the lobed configuration for providing stability between the dental implant and the corresponding secondary part.

Nevertheless, there is still the necessity in the art of dentistry to provide for a dental implant, a secondary part, an insertion tool and a dental implant system including a dental implant and a secondary part, wherein the above-mentioned positioning and stability problems along with the torsional strength and sealing problems are solved in a satisfactory manner.

SUMMARY OF THE INVENTION

The aim of the present invention is to provide an improved dental implant, an improved secondary part, an improved insertion tool and an improved dental implant system including a dental implant and a secondary part which avoids the drawbacks of the prior art devices, and thus allows a stable and sterile coupling between the dental implant and the secondary part in a plurality of angular positions, while at the same time the mechanical strength and the torsional resistance of the coupling between the dental implant and the secondary part and/or the insertion tool are increased as compared to the conventional prior art solutions.

Within the scope of this aim, an object of the present invention is to provide an improved dental implant, an improved secondary part, an improved insertion tool and an improved dental implant system including a dental implant which can be used in a plurality of dental applications for supporting various superstructures.

Further, within the scope of the above aims, another object of the present invention is to provide an improved dental implant, an improved secondary part, an improved insertion tool and an improved dental implant system including a dental implant which can be manufactured easily, thus reducing the overall costs for the production of the dental implant system as a whole and of its individual components.

Yet another object of the present invention is to provide an improved coupling for a multi-part dental implant system, wherein the number of parts is minimized.

This aim, these objects and others which will become more apparent from the description given hereinafter are achieved by a dental implant as defined in claim 1, a secondary part for a dental implant as defined in claim 24, an insertion tool as defined in claim 35 and a dental implant system as defined in claims 45 and 46.

Further advantageous aspects of the present invention are defined in the appended dependent claims.

The present invention provides in certain embodiments thereof for a dental implant for use in a dental implant system including a secondary part, wherein the dental implant has a substantially cylindrical shape with a longitudinal axis defining a longitudinal direction, the dental implant including: a coronal section including a coronal end of the dental implant; a threaded region extending apically from the coronal section to an apical tip of the dental implant; and an internal blind bore for connection to the secondary part, the internal blind bore including: a stabilizing section which extends apically from the coronal end of the dental implant; and a drive and indexing section which extends apically from an apical end of the stabilizing section, wherein the drive and indexing section is provided with a plurality of connecting lobes having a concave shape and extending in the longitudinal direction, the connecting lobes being interconnected by respective lobe linking areas also extending in the longitudinal direction, each of the lobe linking areas including: two convex sections extending in the longitudinal direction and adjacent to a respective connecting lobe; and a concave section extending in the longitudinal direction between the two convex sections.

Preferably, the internal blind bore of the dental implant further includes an apical internally threaded section extending apically from an apical end of the drive and indexing section thereof.

Further preferably, in the dental implant according to the present invention, both the connecting lobes and the lobe linking area extend substantially along the entire axial extension of the drive and indexing section.

Alternatively, each lobe linking area may include an apical portion which has a step-like configuration.

Further preferably, the apical portion of lobe linking area has a lateral surface which is part of a lateral cylinder surface having an axis that is coincident with the axis of the dental implant, wherein the lateral surface is provided with a ledge which extends in a radial direction towards the axis of the dental implant. In a further alternative, the apical portion may have a lateral surface which is part of a truncated cone surface flaring out coronally and having an axis that is coincident with the axis of the dental implant, wherein the lateral surface is provided with a ledge which extends in a radial direction towards the axis of the dental implant. The radial extension of the ledge may be substantially perpendicular to the axis of the dental implant or may be apically inclined with respect to the axis of the dental implant.

According to yet another preferred embodiment of the dental implant of the present invention the connecting lobes are parts of respective cylinders with a lateral area that is parallel to the axis of the dental implant, and wherein preferably the cylinder parts are half-cylinders. Further, the convex and concave sections of the lobe linking areas may also be parts of respective cylinders with a lateral area that is parallel to the axis of the dental implant.

Furthermore, advantageously, the dental implant includes a substantially circular platform at the coronal end of the drive and indexing section which is adjacent to the apical end of the stabilizing section. The substantially circular platform may be formed by the radially protruding coronal parts of the lobe linking areas.

According to an additional advantageous aspect of the dental implant according to the present invention, the drive and indexing region thereof is formed by six connecting lobes and an equal number of the lobe linking areas which are interposed between the connecting lobes.

In the above dental implant, it is particularly advantageous if the stabilizing section is shaped as a truncated cone flaring out in a coronal direction and with a coronal opening having an angle of 5 degrees to 7.9 degrees, more preferably of 5 degrees to 7.7 degrees, even more preferably of 5 degrees to 7 degrees and most preferably 7 degrees with respect to the axis of the dental implant. All foregoing ranges are understood as including the boundary values and furthermore all foregoing values are understood to include deviations from the exact value within the engineering tolerances known to the person skilled in the art. Same applies for all values, ranges of values and ratios indicated in the following description and claims in respect to any feature of the present application.

In the above dental implant the coronal section may preferably include a smooth section extending in the apical direction from the coronal end of the dental implant and a threaded section extending in the apical direction from the apical end of the smooth section up to the coronal end of the threaded region, the threaded section being adapted for securing a secondary part to an external part of the dental implant and/or the threaded section including a reverse thread and/or the threaded section being adapted to facilitate osseointegration of the dental implant in a bone tissue.

The smooth section of the coronal section of the dental implant may preferably comprise a beveled part in the vicinity of the coronal end of the coronal section of the dental implant, wherein the beveled part is apically inclined at its periphery. It is particularly advantageous if the beveled part forms an angle of 17 to 27 degrees, more preferably an angle of 20 to 24 degrees and most preferably an angle of 22.5 degrees with respect to a plane that is perpendicular to the axis of the dental implant.

The coronal end of the dental implant may be defined by an optional flat shoulder which is adjacent to the beveled part, wherein the flat shoulder lies preferably on the plane which is perpendicular to the axis of the dental implant, wherein further preferably along a radius extending from the axis of the dental implant the ratios of the radial width of the flat shoulder to the radial width of the projection of the beveled part on the radius are from 1/5 to 1/3. Otherwise if the flat shoulder is omitted, the beveled part defines the coronal end of the dental implant.

According to a further preferred advantageous aspect of the invention an undercut is provided at the apical end of the drive and indexing section and more preferably between the apical end of the drive and indexing section and a coronal platform of the apical internally threaded section. Preferably the undercut extends apically below the ledges of the apical portion of the lobe linking areas up to a coronal platform of the apical internally threaded section of the internal blind bore of the dental implant. The coronal platform may extend on a plane that is perpendicular to the axis of the dental implant. Furthermore, preferably, the undercut has a reduced extension at the connecting lobes of the drive and indexing section of the dental implant or it can also be omitted at the connecting lobes, such that the undercut will have roughly a petal-like configuration.

In the above dental implant the threaded region may advantageously include at least one flute, each flute being preferably configured to mill bone, collect bone, condense bone and disperse bone when the dental implant is rotated both in the clockwise and in the counterclockwise direction. Further preferably, the thread of the threaded region (14) of the dental implant may have a helical shape.

In other embodiments the present invention provides for a secondary part for use in a dental implant or a dental implant system including a dental implant, the secondary part having a central bore extending along a longitudinal axis thereof, the longitudinal axis defining a longitudinal direction, the secondary part including: a coronal section including a coronal end of the secondary part; a stabilizing section extending apically from an apical end of the coronal section, where preferably at least at an apical part thereof is generally shaped as a truncated cone flaring out in a coronal direction of the secondary part; and an indexing section extending apically from an apical end of the stabilizing section, wherein the indexing section is provided with a plurality of connecting lobes extending in the longitudinal direction and having a convex shape, the connecting lobes being interconnected by respective lobe linking areas also extending in the longitudinal direction, each of the lobe linking areas including two concave sections extending in the longitudinal direction and adjacent to a respective connecting lobe; and a convex section extending in the longitudinal direction between the two concave sections.

Preferably, the secondary part is embodied as an abutment for supporting a single tooth or a dental bridge.

Preferably, in the above-mentioned secondary part both the connecting lobes and the lobe linking areas of the indexing section extend substantially along the entire axial extension of the indexing section.

Further, preferably, in the secondary part the connecting lobes are parts of respective cylinders with a lateral area that is parallel to the axis of the secondary part, and the cylinder parts are further preferably half-cylinders.

Also preferably the concave and convex sections of the lobe linking areas are parts of respective cylinders with a lateral area that is parallel to the axis of the secondary part.

Advantageously, the number of connecting lobes and the number of lobe linking areas of the indexing section of the secondary part are equal to six.

According to an advantageous aspect of the above-described secondary part the apical part of the stabilizing section is shaped as a truncated cone flaring out in a coronal direction and with a coronal opening having an angle of 5 degrees to 7.9 degrees, more preferably of 5 degrees to 7.7 degrees, even more preferably of 5 degrees to 7 degrees and most preferably 7 degrees with respect to the axis of the secondary part.

The stabilizing section may further advantageously include a coronal part which has a larger outward flaring region in comparison to the outward flaring region of the apical part of the stabilizing section, such as to allow the formation of the supporting ledge at the apical end of the coronal section of the secondary part.

Furthermore, according to an optional aspect, the coronal section of the above-mentioned secondary part further includes means for rotationally positioning a dental prosthesis thereon, wherein the prosthesis may include a single tooth or a dental bridge.

According to a further advantageous aspect of the above-mentioned secondary part the interface between the coronal part of the stabilizing section and the apical part of the stabilizing section is formed as a beveled surface, wherein the beveled surface is apically inclined towards its periphery. The beveled surface may form an angle of 17 to 27 degrees, more preferably an angle of 20 to 24 degrees and most preferably an angle of 22.5 degrees with respect to a plane that is perpendicular to the axis A of the secondary part.

In further embodiments the present invention provides for an insertion tool for use in a dental implant or a dental implant system including a dental implant, wherein the insertion tool has a longitudinal axis defining a longitudinal direction, the insertion tool including a coronal section having a shank portion for connection to a rotary device; and an apical section for engagement with an internal bore of the dental implant, wherein the apical section includes from coronal to apical a first stabilizing section and a drive section, and wherein the drive section is provided with a plurality of connecting lobes having a convex shape and extending in the longitudinal direction, the connecting lobes being interconnected by respective lobe linking areas also extending in the longitudinal direction, each of the lobe linking areas being substantially of concave shape.

Preferably, the lobe linking areas of the drive section of the insertion tool include two concave sections extending in the longitudinal direction and adjacent to a respective connecting lobe thereof; and a convex section extending in the longitudinal direction between the two concave sections.

Also preferably, in the above-mentioned insertion tool both the connecting lobes and the lobe linking area of the drive section extend substantially along the entire axial extension of the drive section.

The connecting lobes of the drive section of the foregoing insertion tool are parts of respective cylinders with a lateral area that is parallel to the axis of the insertion tool, and wherein preferably the cylinder parts are half-cylinders.

Furthermore, preferably the lobe linking areas of the drive section of the foregoing insertion tool are parts of respective cylinders with a lateral area that is parallel to the axis of the insertion tool, wherein further preferably the cylinder parts are half-cylinders.

Alternatively, when the lobe linking areas of the drive section of the insertion tool include two concave sections extending in the longitudinal direction and adjacent to a respective connecting lobe thereof; and a convex section extending in the longitudinal direction between the two concave sections, the concave and convex sections of the lobe linking areas are parts of respective cylinders with a lateral area that is parallel to the axis of the insertion tool.

The number of connecting lobes and the number of lobe linking areas of the drive section of the above-mentioned insertion tool are preferably equal to six.

In the above-mentioned insertion tool the first stabilizing section may be shaped generally as a truncated cone flaring out coronally, and further preferably a coronal opening of the first stabilizing section has an angle of 5 degrees to 7.9 degrees, more preferably of 5 degrees to 7.7 degrees, even more preferably of 5 degrees to 7 degrees and most preferably 7 degrees with respect to the axis of the insertion tool.

The insertion tool may further include a circular recess which is formed peripherally around the axis of the insertion tool, the circular recess dividing the drive section into a coronal part and an apical part, the circular recess being adapted to house a resilient O-ring or a split C-ring.

In a preferred embodiment the above-described insertion tool includes a second stabilizing section arranged at an apical end of the drive section and defining the apical end of the insertion tool, wherein the second stabilizing section has preferably a cylindrical shape dimensioned to match an internal threaded section of the blind bore of the dental implant.

Furthermore, the coronal section of the above-described dental implant may include in a coronal region thereof an engagement element configured to engage a rotary machine and/or the coronal section of the insertion tool may include in an apical region thereof a manual tool engagement section configured to engage a manual torque applying tool, wherein preferably the manual tool engagement section is hexagonal along an axial cross section of the insertion tool with each side of the hexagon including a plurality of recesses, preferably of a substantially conical configuration.

In yet other embodiments a dental implant system is provided, wherein the dental implant system includes a dental implant and a secondary part as set forth hereinabove. Preferably, the dental implant system further includes an attachment tool as described hereinabove.

The dental system may also further include a healing cap, an impression cap and a threadable secondary part which can be threaded externally to the dental implant without the need for a fixation screw extending through the internal blind bore of the dental implant.

Preferably, the threadable secondary part includes an internal thread in a section thereof of an axially symmetric shape, such that the threadable secondary part is threadable to the externally threaded section of the coronal section of the dental implant. The threadable secondary part may further include an internal beveled surface having an inclination angle of 17 to 27 degrees, more preferably an angle of 20 to 24 degrees and most preferably an angle of 22.5 degrees with respect to a plane that is perpendicular to a longitudinal axis of the threadable secondary part. Further the threadable secondary part may have the overall shape of an axially symmetric rotation body including a coronal cylindrical section, a beveled truncated cone-shaped section and an apical cylindrical section, wherein preferably the coronal cylindrical section of the threadable secondary part is smaller in diameter than the apical cylindrical section of the threadable secondary part and the beveled truncated cone-shaped section forms therebetween an apposition surface for a superstructure, wherein further preferably the beveled truncated cone-shaped section forms an angle of 17 to 27 degrees, more preferably an angle of 20 to 24 degrees and most preferably an angle of 22.5 degrees with respect to a plane that is perpendicular to the axis of the secondary part.

Preferably, the healing cap is shaped as a rotationally symmetrical rotation body along a longitudinal axis thereof, the healing cap having an enlarged head arranged at the coronal end thereof, wherein the enlarged head is provided with wrench engaging means, the enlarged head of the healing cap being followed further apically by a stabilizing section which matches exactly the stabilizing section of the dental implant.

The healing cap may optionally further include apically from the stabilizing section an intermediate section and a threaded section which is adapted to threadingly engage the internal thread of the apical internally threaded section of the internal blind bore of the dental implant.

According to a further preferred alternative the healing cap includes further apically from the stabilizing section an additional section that follows the outline of the drive and indexing section of the dental implant.

Further in all embodiments the healing cap may advantageously include an internal beveled surface which exactly follows the shape of the beveled part of the smooth section of the coronal section of the dental implant, such that the internal beveled surface of the healing cap has an angle of 17 to 27 degrees, more preferably an angle of 20 to 24 degrees and most preferably an angle of 22.5 degrees with respect to a plane that is perpendicular to the longitudinal axis of the healing cap.

BRIEF DESCRIPTION OF THE DRAWINGS

Further characteristics and advantages of the present invention will become more apparent from the following description of a preferred but not exclusive embodiment of the implant system according to the invention, illustrated by way of non-limitative example in the accompanying drawings, wherein:

FIG. 1 is a side view of a dental implant incorporating a coupling for a secondary part, wherein the coupling is devised according to the present invention;

FIG. 2 is a broken cross-sectional perspective view of the dental implant of FIG. 1;

FIG. 3 is a top view of the dental implant of FIG. 1;

FIG. 8A is a side view of the dental implant of FIGS. 1 through 4 with an insertion tool mounted thereon;

FIG. 8B is a cross-sectional view of the dental implant of FIG. 8A with an insertion tool mounted thereon;

FIG. 8C is a broken cross-sectional perspective view of the dental implant of FIG. 8A with the insertion tool mounted thereon;

FIG. 8D is a perspective view of the dental implant of FIG. 8A with the insertion tool mounted thereon;

FIG. 9 is a perspective view of an insertion tool according to the present invention adapted to be received in the dental implant according to the present invention as described in the above figures;

FIG. 10A is a side view of the dental implant of FIGS. 1 through 4 with a further different secondary part mounted thereon;

FIG. 10B is a partially sectional view of the dental implant of FIG. 10A with the further different secondary part mounted thereon;

FIG. 10C is a broken cross-sectional perspective view of the dental implant of FIG. 10A with the further different secondary part mounted thereon;

FIG. 11A is a side view of the dental implant of FIGS. 1 through 4 with a healing cap mounted thereon;

FIG. 11B is a cross-sectional view of the dental implant of FIG. 11A with the healing cap mounted thereon; and FIG. 11C is a broken cross-sectional perspective view of the dental implant of FIG. 11A with the healing cap mounted thereon.

DETAILED DESCRIPTION OF THE INVENTION

Figure 2A:
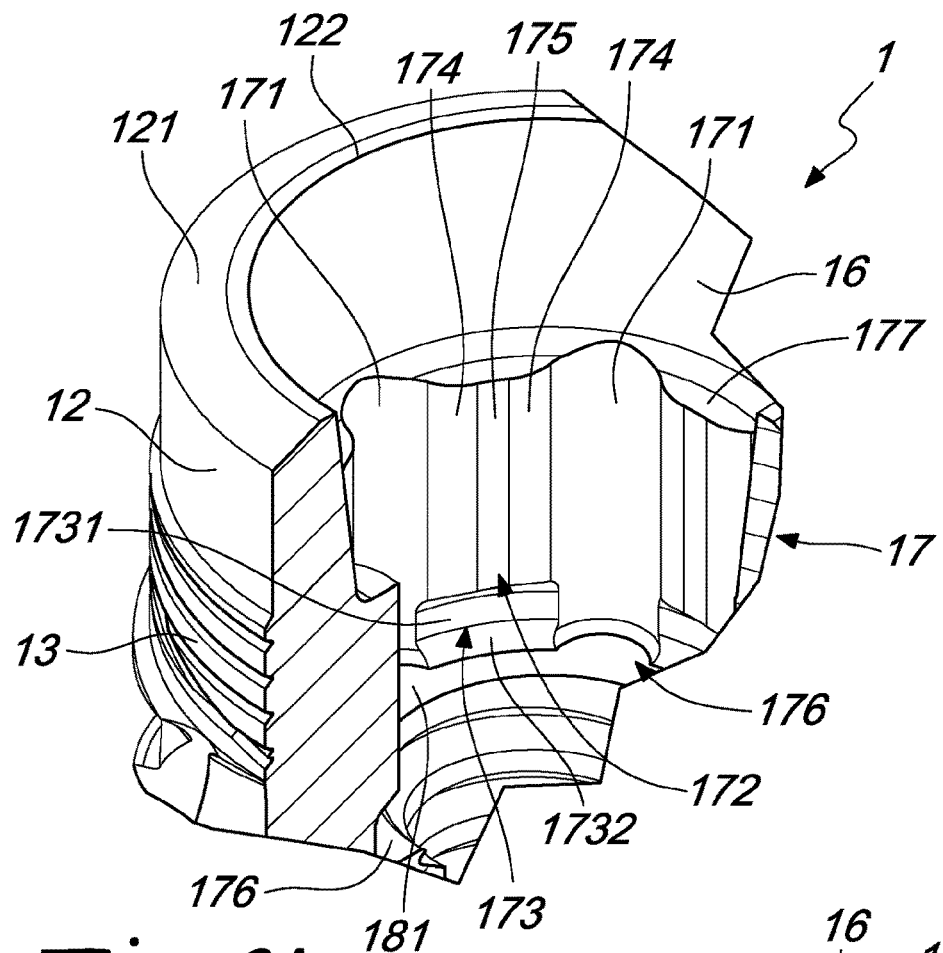
FIG. 2A is an enlarged presentation of a section of the broken cross-sectional perspective view of the dental implant of FIG. 2.

Whenever reference is made in the present specification to connecting lobes or to linking areas as having a concave or a convex shape, such concavity or convexity is understood as referring to a transverse cross section of a dental implant, a secondary part, an insertion tool, a healing cap along a plane that is perpendicular to a longitudinal axis of the listed dental items.

With reference to the enclosed FIG. 1 reference numeral 1 designates a dental implant, in particular a dental implant screw, having a coronal section 11 and a threaded region 14 extending apically from the coronal section 11 to an apical tip 15 of the dental implant 1. The coronal section 11 includes at an external part thereof a smooth section 12 extending in the apical direction from the coronal end of the dental implant 1 and a threaded section 13 extending in the apical direction from the apical end of the smooth section 12 up to a coronal end of the threaded region 14. The dental implant 1 has a substantially cylindrical shape with a longitudinal axis A as indicated, for instance, in FIG. 1.

The threaded section 13 of the coronal section 11 of the dental implant 1, which is an optional feature of the dental implant 1, may be provided to improve bone retention and osseointegration, for example in the form of micro-threads. Optionally the threaded section 13 of the coronal section 11 may be configured to have a double lead, with preferably a pitch of 0.5 mm and a thread angle of 25 degrees to 45 degrees and more preferably from 25 degrees to 35 and most preferably 25 degrees. Optionally the threaded section 13 of the coronal section 11 may be configured according to the configuration of the threaded section 14 of the dental implant 1 and/or it may be configured to facilitate osseointegration of the dental implant 1 within the bone. Optionally the threaded section 13 of the coronal section 11 of the dental implant 1 may be configured according to at least one or more threading parameters as known in the art, for example including, but not limited to lead, pitch, thread angle, thickness, major diameter, minor diameter, taper angle, thread orientation, end position, starting position, porosity, number of stops, number of starts, number of leads, number of cuts, lead-in angle or the like or any combination thereof of threading variables and/or parameters.

Yet according to another preferred alternative, the threaded section 13 of the coronal section 11 of the dental implant 1 may be embodied as a reverse thread on the external part of the dental implant 1 for facilitating removal of the dental implant 1 from the bone into which it has been inserted. Such removal of the dental implant can be performed by means of an instrument that is well-known to the person skilled in the art.

Furthermore, the threaded section 13 of the coronal section 11 of the dental implant 1 along with the flutes describes hereinbelow may be of the self-drilling, self-tapping, self-collection bone and bone condensing type as disclosed in detail in the International Patent Application WO 2015/118543 A1 in the name of Fromovich, the respective content thereof being herewith incorporated by reference. Thus, the threaded section and the flutes of this invention provide for a dynamic action during the bone insertion. The implant according to latter embodiments may be utilized at a heal site following bone growth or it may be utilized at an extraction site.

Yet according to another preferred alternative, the threaded section 13 of the coronal section 11 of the dental implant 1 may be embodied as a thread for securing a secondary part which is fixed to the external part of the dental implant 1. In the context of the present invention a secondary part is intended to designate any superstructure which can be placed on a dental implant such as, for instance, a dental abutment adapted for supporting a single tooth including a dental crown or for supporting a dental bridge. For better comprehension in this description the generic term "secondary part" will be used, unless the "secondary part" is intended to designate a specific element such as, for instance, an abutment adapted for supporting a single tooth including a dental crown or for supporting a dental bridge or for holding a healing cap or an impression cap.

The smooth section 12 of the coronal section 11 of the dental implant 1 may further optionally comprise a beveled part 121 in the vicinity of the coronal end thereof. In this way the smooth section 12 of the coronal section 11 of the dental implant 1 will have generally from coronal to apical a truncated cone outline followed by a cylindrical outline. The beveled part 121 advantageously provides for a more stable connection to a superimposed secondary part. Further, the beveled part 121 may also advantageously provide for a better sealing with the superimposed secondary part, as will be explained hereinbelow.

Preferably, the beveled part 121 forms an angle of 17 to 27 degrees, more preferably an angle of 20 to 24 degrees and most preferably an angle of 22.5 degrees with respect to a plane that is perpendicular to the axis A of the dental implant 1. The latter most preferred inclination angle of the beveled part 121 is particularly advantageous in terms of mechanical stability and sealing when the dental implant is connected to a superimposed secondary part which may be embodied, for instance, as an abutment adapted for supporting a single tooth or for supporting a dental bridge.

The coronal end of the dental implant 1 is preferably defined by a flat shoulder 122 which is adjacent to the beveled part 121. The flat shoulder 122 lies preferably on the plane which is perpendicular to the axis A of the dental implant 1. Further, the flat shoulder 122 is preferably relatively narrow as compared to the beveled part 121. Along a radius extending from the axis A of the dental implant 1 preferred ratios of the radial width of the flat shoulder 122 to the radial width of the projection of the beveled part 121 on the radius are from 1/5 to 1/3.

The flat shoulder 122 also provides advantageously, in conjunction with the beveled part 121, for a centering platform for a secondary part that is superimposed on the dental implant. Such superimposed secondary part may comprise, as mentioned above, an abutment adapted for supporting a single tooth including a dental crown or for supporting a dental bridge.

According to a further preferred option, the smooth section 12 extending below the beveled part 121 may be optionally machined and acid etched and/or provided with micro grooves so as to improve the osseointegration of the dental implant 1.

The threaded region 14 of the dental implant 1 is preferably fitted with at least two flutes 141 disposed along its full length. As disclosed in detail in the International Patent Application WO 2015/118543 A1 in the name of Fromovich, who is also the inventor of the present invention, the flutes 141 are preferably configured to mill bone, collect bone, condense bone and disperse bone when the dental implant 1 is rotated with a dental implant maneuvering tool, for example in the form of a dental hand-piece, both in the clockwise and in the counterclockwise direction. The thread of the threaded region 14 of the dental implant 1 is designated with reference numeral 142 and preferably has a helical shape.

FIGS. 2 and 2A show an internal blind bore of the dental implant 1 including a stabilizing section 16 which extends apically from the coronal end of the dental implant 1, said coronal end being defined by the shoulder 122, if present, or by the beveled part 121, a drive and indexing section 17 which extends apically from the apical end of the stabilizing section 16 and an apical internally threaded section 18 extending apically from the apical end of the drive and indexing section 17.

The stabilizing section 16 extends from the shoulder 122 defining the coronal end of the dental implant 1 in an apical direction or from the beveled part 121 if the shoulder 122 is omitted. The shoulder 122 is, as explained, preferably substantially flat and lies on a plane which is perpendicular to the axis A of the dental implant 1. Nevertheless, according to a variation of the embodiment shown in FIGS. 2 and 2A the shoulder 122 may have an inclination with respect to the plane which is perpendicular to the axis A of the dental implant 1 so as to match the shape of the secondary part (for instance an abutment) placed over the dental implant 1. The shoulder 122 further extends preferably around the whole blind bore of the dental implant 1 and has a constant width around the same.

The stabilizing section 16 of the present invention is intended to provide for a highly stable connection between the dental implant and the secondary part. At the same the stabilizing section 16 is intended to provide for good sealing with a complementarily shaped section of the secondary part which is received in the internal blind bore of the dental implant 1. In addition, the stabilizing section 16 provides for a self-locking function with the complementarily shaped section of the secondary part when the secondary part is inserted into the internal blind bore of the dental implant 1.

Figures 4, 5A:
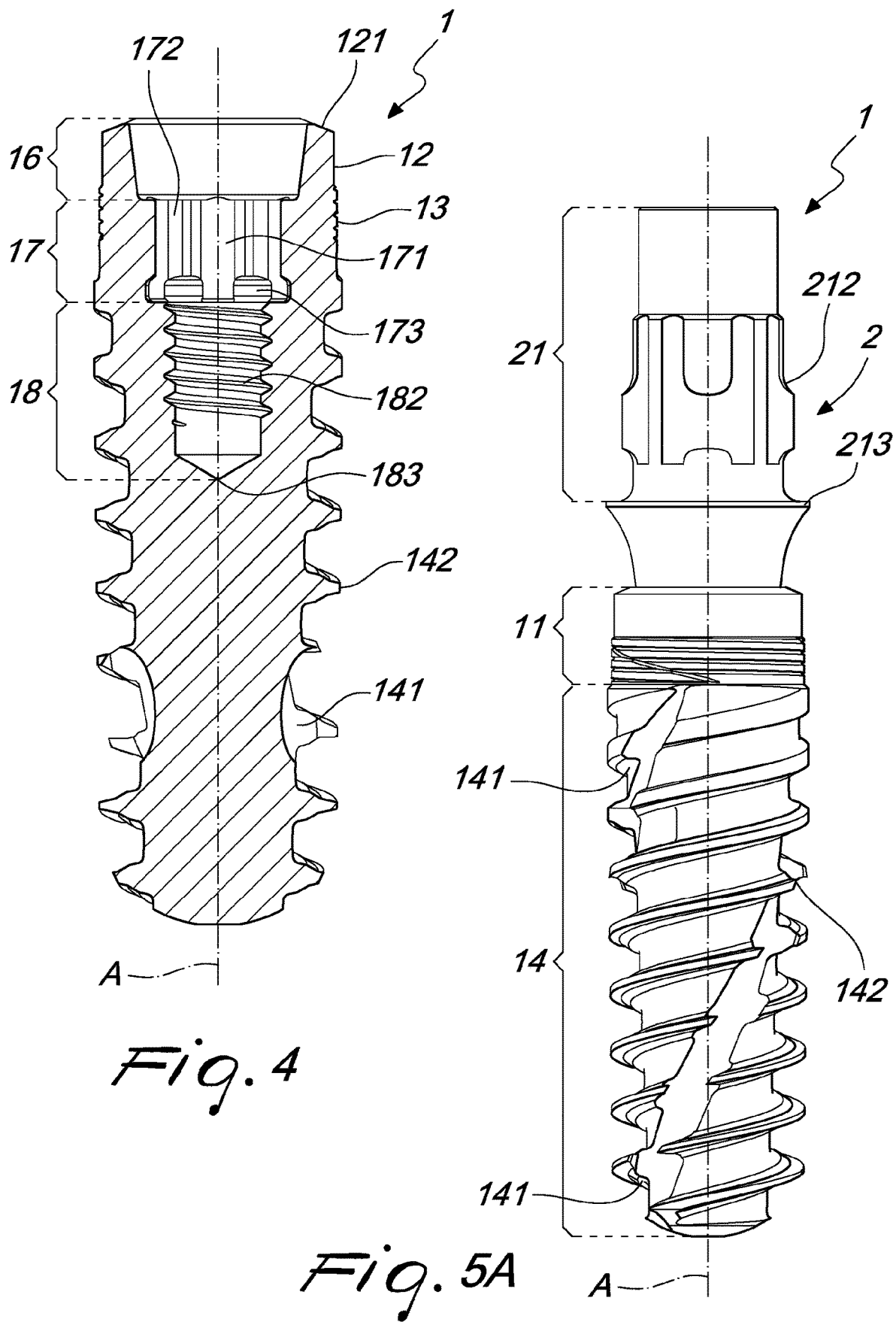
FIG. 4 is a partially sectional view of the dental implant of FIG. 1.
FIG. 5A is a side view of the dental implant of FIGS. 1 through 4 with the secondary part mounted thereon.

With reference to FIG. 4 the stabilizing section 16 is shaped as a truncated cone flaring out in a coronal direction and having a coronal opening with an angle of 5 degrees to 7.9 degrees, more preferably of 5 degrees to 7.7 degrees, even more preferably of 5 degrees to 7 degrees and most preferably 7 degrees with respect to the axis A of the dental implant 1. The inventor of the present application has found that the above opening range of the stabilizing section 16 in general and the preferred value of 7 degrees in particular provide for a highly stable connection between the dental implant and the secondary part combined with an optimal sealing between the dental implant and the secondary part as well as an optimal self-locking effect of the secondary part in the internal blind bore of the dental implant.

With further reference to FIGS. 2, 2A, 3, 3A, 3B and 4 the drive and indexing section 17 of the dental implant 1 will be described in more detail.

In particular, according to the present invention, the drive and indexing section 17 of the dental implant 1 is provided with a plurality of connecting lobes 171 having a concave shape extending substantially along the entire axial extension of the drive and indexing section 17. Preferably, the connecting lobes 171 are parts of respective cylinders with a lateral area that is parallel to the axis A of the dental implant 1. Further, preferably, the cylinder parts defining the connecting lobes 171 may be embodied as half-cylinders.

In the particular embodiment shown in FIGS. 2, 2A, 3, 3A, 3B and 4 the number of connecting lobes 171 is equal to six, but the person skilled in the art will appreciate that the number of connecting lobes 171 can be varied according to the number of indexing positions of the secondary part on the dental implant and also for providing a sufficient torque coupling to rotate and thus install the dental implant in a jaw bone of a patient and further to also remove the dental implant, if needed. In fact, as will be appreciated by the person skilled in the art a higher number of connecting lobes 171 will allow a more accurate indexing or rotational positioning of a secondary part on the dental implant; nevertheless, the larger the number of connecting lobes 171 the lower the mechanical stability and thus the ability to withstand a higher torque for installing or removing the dental implant. Furthermore, the provision of a larger number of connecting lobes 171 also puts a higher burden on the manufacturing process of the dental implant and inherently on the manufacturing process of the secondary part and/or of the insertion tool which must be provided with an indexing section that is complementary to the drive and indexing section 17 of the dental implant 1. Clearly, as mentioned hereinabove, also the stabilizing section 16 of the dental implant 1 must be shaped to be complementary to the corresponding section of the secondary part and/or the insertion tool which will be discussed more in detail hereinbelow.

The inventor of the present application has found that a number of six connecting lobes 171, as illustrated in FIGS. 2, 2A, 3, 3A, 3B and 4, is preferred since it balances best the constraints pertaining to indexing, mechanical stability, torque resistance and manufacturing complexity. In particular, torque resistance and mechanical stability are a problem that is relevant during the insertion or removal process of the dental implant with respect to the underlying bone by means of an appropriate tool. Such appropriate tool and its interaction with the dental implant will be discussed hereinbelow. Nevertheless, as will be appreciated by the person skilled in the art, the mechanical stability is also an issue during the entire use of the dental implant after its insertion into the bone.

With particular reference to FIGS. 2A, 3, 3A and 3B it can be seen that the connecting lobes 171 are interconnected by respective lobe linking areas which are generally designated by reference numeral 172. Each of the lobe linking areas 172 has the same axial extension as the connecting lobes 171. Nevertheless, according to a preferred variation as shown in FIGS. 2A, 3, 3A and 3B, an apical portion 173 of the lobe linking areas 172 has a step-like configuration.

In the embodiment wherein the number of connecting lobes 171 is equal to six, the number of apical portions 173 of the lobe linking areas 172 (and obviously the number of the lobe linking areas 172) is also equal to six. Clearly, as the lobe linking areas 172 are interposed between the connection lobes 171, their respective numbers will be equal.

In the embodiment with the step-like configuration the respective lateral surfaces of the apical portions 173 of the lobe linking areas 172, which are designated by reference numeral 1731, are part of a lateral cylinder surface which has an axis coincident with the axis A of the dental implant 1. Nevertheless, according to a variation of the foregoing, the respective lateral surfaces 1731 of the apical portions 173 of the lobe linking areas 172 can be part of a truncated cone having an axis that is coincident with the axis A of the dental implant 1. Each of the lateral surfaces 1731 of the apical portions 173 of the lobe linking areas 172 may be provided with a respective ledge designated by reference numeral 1732 which extends in a radial direction towards the axis A of the dental implant 1. The ledges 1732 may extend in a radial direction that is substantially perpendicular to the axis A of the dental implant 1 or may have an inclination to the same, so as to provide for a further centering function for the secondary part or the insertion tool once the same is inserted into the internal blind bore of the dental implant, as discussed hereinbelow.

All apical portions 173 of the lobe linking areas 172 have equal axial extensions and the step-like configuration defined by a lateral surface 1731 in conjunction with the respective ledge 1732 advantageously provides the function of guiding a secondary part or an insertion tool when the secondary part or the insertion tool are connected to the dental implant 1. The guiding function is particularly advantageous if the secondary part or the insertion tool is connected to the dental implant 1 by means of a click-in connection. It is also particularly advantageous in this context if the ledges 1732 are inclined in the apical direction, as compared to a plane perpendicular to the axis A of the dental implant 1, such that a sliding surface is provided for the click-in connection or the connection in general if the click-in feature is missing. For instance, advantageously, the inclination with respect to the plane perpendicular to the axis A of the dental implant 1 may be less than 30 degrees, more preferably less than 20 degrees and most preferably less than 10 degrees.

However, it should be borne in mind that the main objective of the present invention is to keep the axial extension of the lobe linking areas 172 as large as possible for the purpose of high mechanical stability, high torque resistance and for the other reasons discussed hereinbelow, and to this end the respective apical portion 173 with the step-like configuration thereof, if present, should be kept as short as possible. Accordingly, it is preferred that the ratio of the axial extension of the apical portion 173 to the overall axial extension of the lobe linking area 172 is from 1/20 to 1/4 and more preferably from 1/10 to 1/5 and most preferred from 1/8 to 1/5.

Each of the lobe linking areas 172 is shaped, according to the invention, generally with a convex shape further including a central section that has a concave shape. Thus, as is apparent for instance in the upper view of FIG. 3, the general outline defined by the connecting lobes 171 and the lobe linking areas 172 is similar to that of a torx screw, however modified due to the particular outline at the lobe linking areas 172. The overall outline of the lobe linking areas 172 and of the connecting lobes 171 will also be designated in the following description as a "modified torx".

Figure 3A:
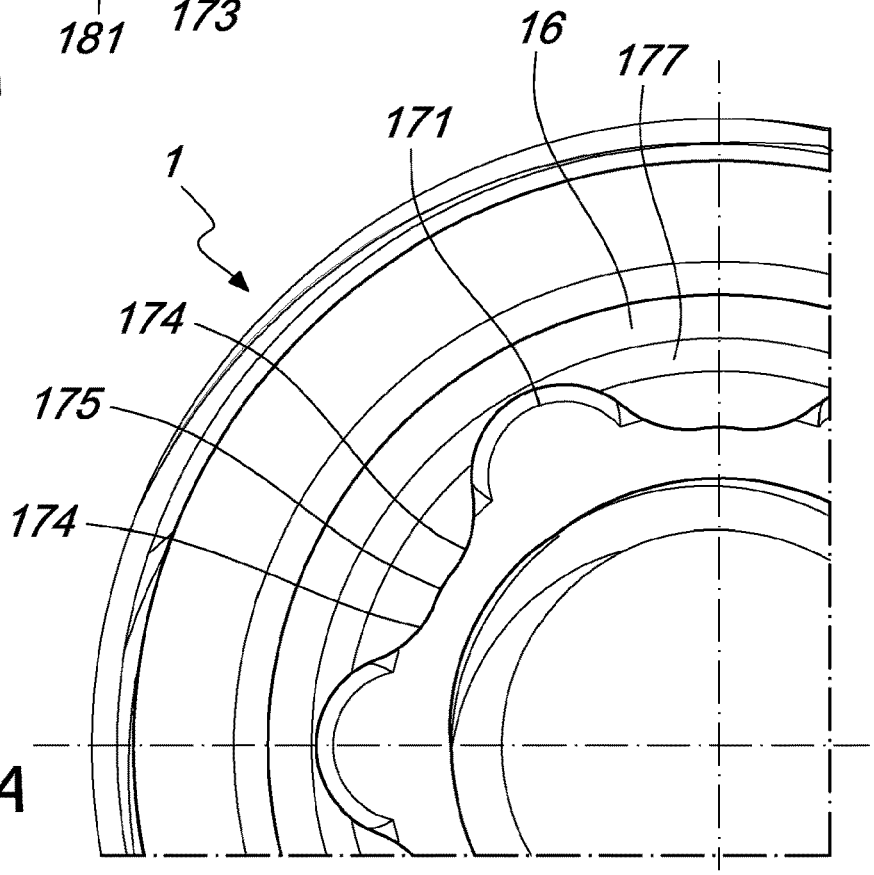
FIG. 3A is an enlarged detail of the top view of the dental implant according to FIG. 3.
Figure 3B:
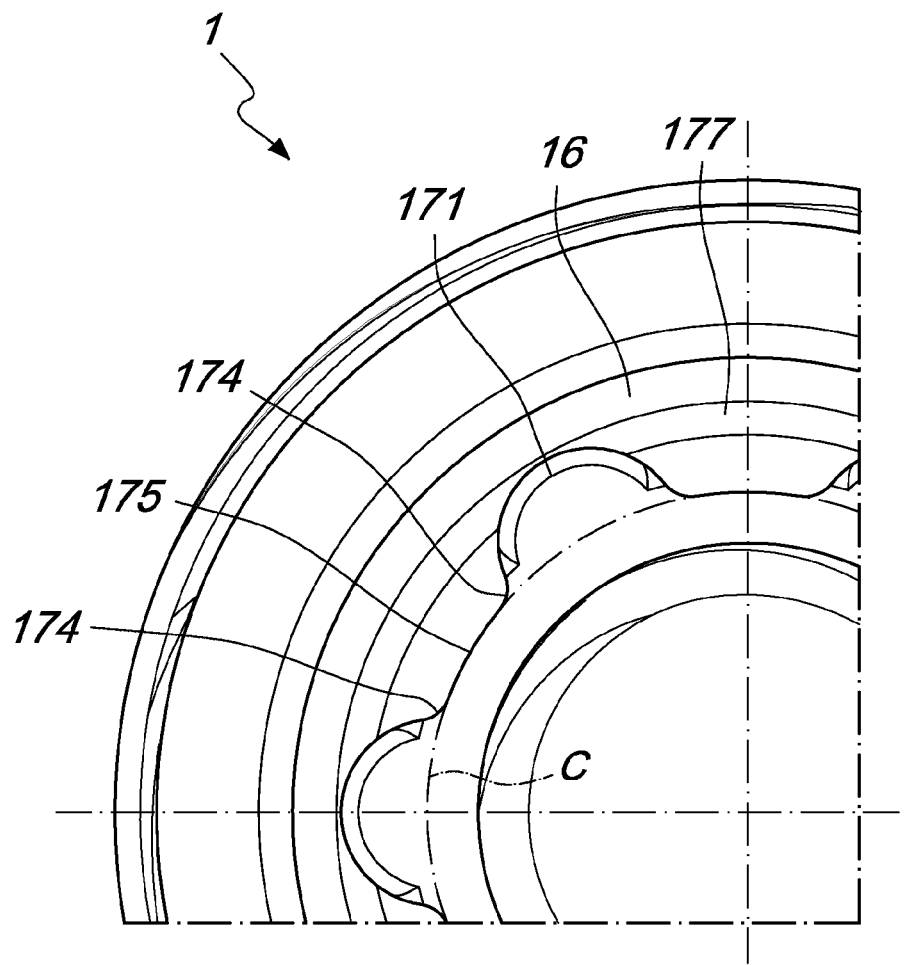
FIG. 3B is a variation of the enlarged detail of FIG. 3A.

In FIGS. 2A, 3A and 3B the concave section of a lobe linking area 172 is designated with reference numeral 175 while the adjacent two convex sections of a lobe linking area are designated with reference numeral 174. Generally, the lateral areas of the sections of the lobe linking areas 172 are parts of respective cylinders and extend in parallel to the axis A of the dental implant 1, in a manner similar to that of the lateral areas of the connecting lobes 171.

By means of the shape of the lobe linking area 172 of the dental implant according to the present invention, whereby a larger contact surface with a secondary part or an insertion tool is provided, the lobe linking area 172 can achieve a particularly stable mechanical connection with a secondary part (for instance an abutment) and/or an insertion tool, while at the same time the drive and indexing section 17 can withstand a high torque without being damaged during the insertion of the dental implant into the bone of a patient and during the use of the dental implant. Furthermore, the shape of the lobe linking area 172 of the dental implant according to the present invention improves the rotational stability of the connection of the dental implant with the secondary part. In addition, a better sealing between the dental implant and the secondary part is achieved, such sealing avoiding the penetration of non-desirable material or liquid into the cavity defined by the internal blind bore of the dental implant. The mechanical strength and the tightness of the connection between the dental implant and the secondary part are further improved by the combination of the lobe linking area 172 according to the present invention and the connecting lobes 171. The same applies to the torque resistance and the rotational stability of the drive and indexing section 17 according to the present invention.

Advantageously, the combined axial extensions of the connecting lobes 171 and the lobe linking areas 172 which form the drive and indexing section 17 are larger than the axial extension of the stabilizing section 16 of the dental implant 1. In practice the inventor of the present application has found that preferably the ratio of the axial length of the indexing section 17 to the axial extension of the stabilizing section 16 is from 2/1.8 to 2/1 and more preferably from 2/1.6 to 2/1.2 and most preferably from 2/1.5 to 2/1.3.

A shorter axial extension of the stabilizing section 16 reduces the absolute narrowing of the same at the coronal end of the dental implant which is due, as has been explained, to the taper resulting from the truncated cone shape of the stabilizing section 16. Therefore, the coronal end of the stabilizing section 16 has sufficient material strength. Such material strength facilitates manufacturing of the dental implant 1 and also provides for a better mechanical stability thereof, when the secondary part is inserted in the coronal opening of the stabilizing section 16.

On the other hand, a larger axial extension of the drive and indexing section 17 (combined with a matching axial extension of the corresponding section of the secondary part) provides for a more stable retention of the secondary part (the "tube-in-tube" effect). The "tube-in-tube" effect is further improved by the additional concave surfaces provided in the lobe linking areas 172. Also by means of the sequence of contact surfaces in one section defined by one connecting lobe 171 and one lobe linking area 172, which is concave (at 171), convex (at 174), concave (at 175) and again convex (at 174), the "tube in tube" effect is amplified. This is true for the connection to a secondary part or an insertion tool and indeed to any other type of superimposed element which has a connection outline complementary to the above concave/convex sequence.

Furthermore, along the lines explained in conjunction with the particular shape or outline of the lobe linking areas 172 of the drive and indexing region 17 of the dental implant 1, whereby a larger contact surface with a secondary part or with an insertion tool becomes available, such contact surface is further increased by the axial extension of the drive and indexing section 17.

In a variation of FIG. 3A, which is shown in FIG. 3B, the concave section 175 of the lobe linking area 172 may have a lager extension, as seen in a radial direction from the axis A of the dental implant 1, as compared to FIG. 3A and the adjacent convex sections 174 of the lobe linking area 172 are shortened accordingly.

Advantageously, in all embodiments of the present invention, the concave sections 175 of the lobe linking areas 172 extend along the lateral face of a straight cylinder with its center on the axis A of the dental implant 1, the cylinder being indicated with the dotted line C FIG. 3B.

Alternatively, according to the invention, the concave sections 175 of the lobe linking areas 172 may have a more accentuated concavity, so that they extend outwardly beyond the lateral face of the straight cylinder with its center on the axis A of the dental implant 1. While in the illustrated embodiments the concave sections 175 of the lobe linking areas 172 have the same concavity it is also conceivable that the concave sections 175 of the lobe linking areas 172 have different concavities and extend to a different degree into the dental implant. Same is true for the connecting lobes 171.

Nevertheless, in all embodiments the convex sections 174 of the lobe linking areas 172 are still present even if shortened.

As shown in FIG. 2A an undercut 176 is provided at the apical end of the drive and indexing section 17. More precisely, the undercut 176 extends apically below the ledges 1732 of the apical portion of the lobe linking areas 172 up to a coronal platform 181 of the apical internally threaded section 18 of the internal blind bore of the dental implant 1. The coronal platform 181 extends preferably on a plane that is perpendicular to the axis A of the dental implant 1. At the connecting lobes 171 of the drive and indexing section 17 the undercut 176 has a reduced extension in view of the concave shape, preferably the half-cylinder shape of the connecting lobes 171. The undercut 176 is intended, as explained above, for the connection of a secondary part or an insertion tool by means of a click-in connection, as will be described hereinafter.

According to a further advantageous aspect of the present invention, at the coronal end of the drive and indexing section 17 which is adjacent to the apical end of the stabilizing section 16, a substantially circular platform 177, as shown in FIGS. 2A, 3A and 3B, is formed by the non-removed material of the lobe linking areas 172 which form the modified torx outline. This substantially circular platform 177 may be advantageously used to retain and/or support an O-ring, the function of which will be discussed hereinafter.

With renewed reference to FIG. 2, the apical internally threaded section 18 further includes an internal thread 182 extending in an apical direction from the coronal platform 181 and further apically an apical end 183 which is not threaded and which has preferably a conical shape. The internal thread 182 is intended, as is well-known in the art, for the threading engagement with a connection or securing screw for retaining in place the secondary part on the dental implant 1. Both the internal thread 182 and the apical end 183 of the apical internally threaded section 18 are of conventional design (and thus well-known to the person skilled in the art) and accordingly a detailed description thereof will be omitted.

With reference to FIGS. 5A, 5B, 5D and 5E a dental implant 1 with a secondary part 2 mounted thereon is shown. As far as the dental implant 1 is concerned, its construction is the same as that of the dental implant of FIGS. 1 through 4, and accordingly a further detailed description thereof will be omitted.

The secondary part 2 shown, which is embodied as an abutment, in particular as an abutment for supporting a single replacement tooth or a dental bridge, includes a coronal section 21, followed further apically by a stabilizing section 22 and by an indexing section 23.

Figures 5B, 5C:
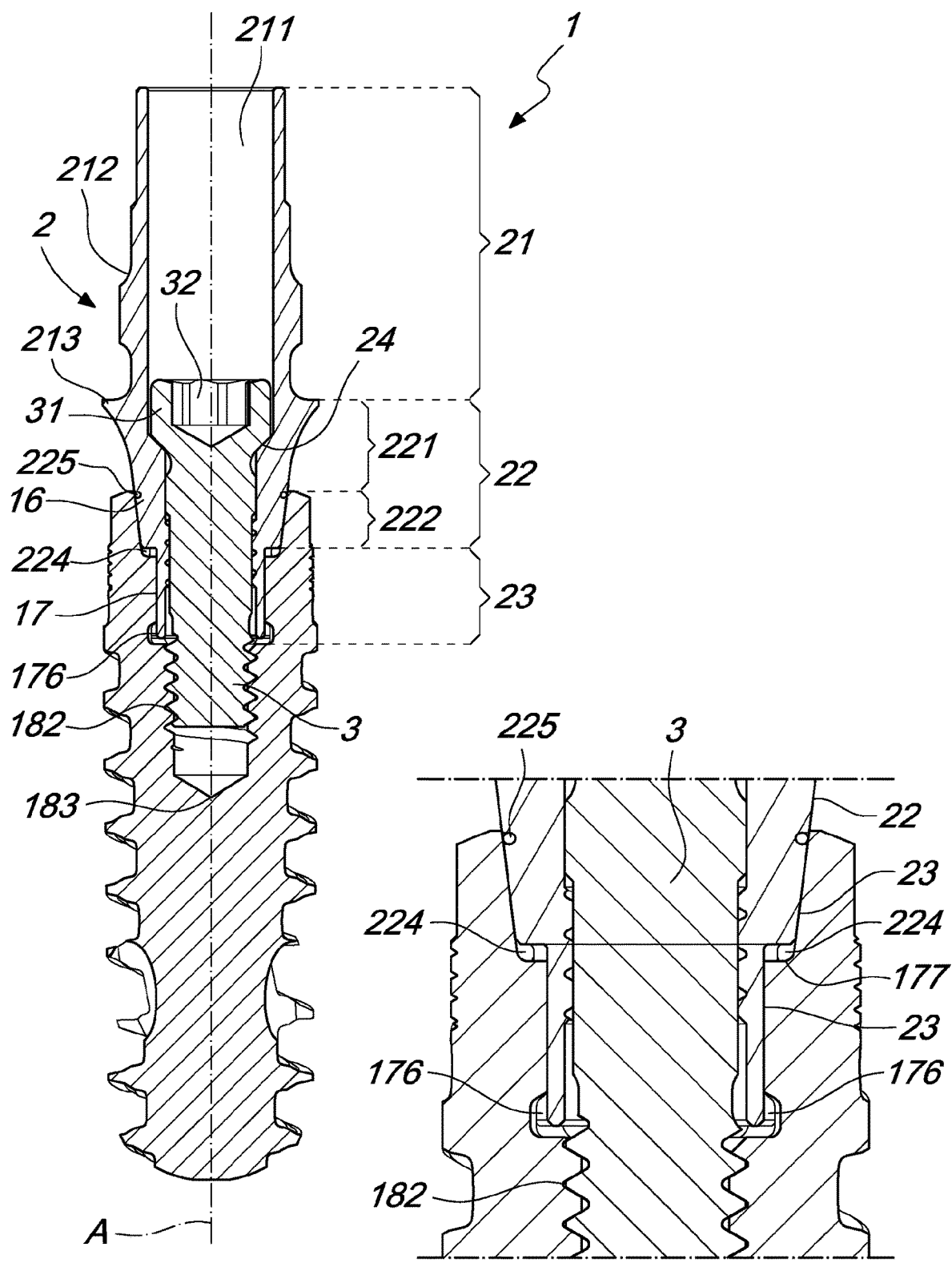
FIG. 5B is a cross-sectional view of the dental implant of FIGS. 1 through 4 with a secondary part mounted thereon.
FIG. 5C is an enlarged detail view of FIG. 5B.
Figure 5D:
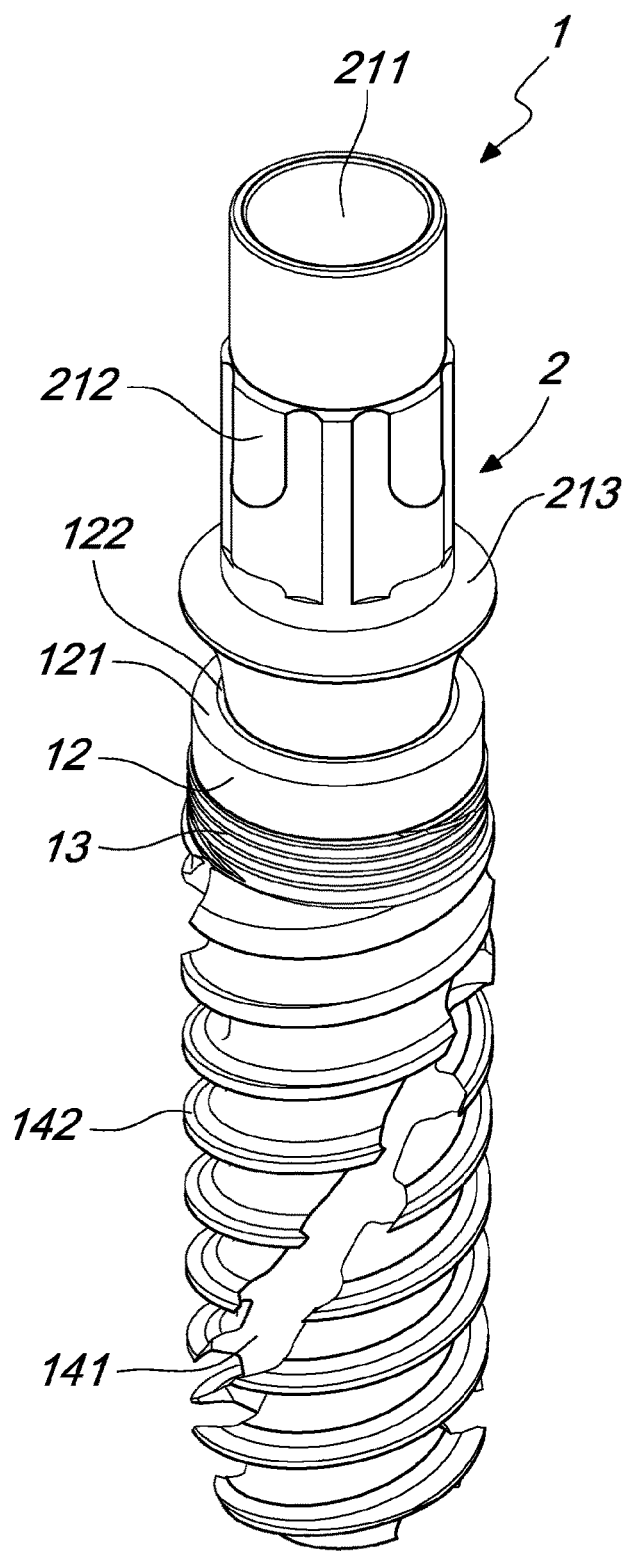
FIG. 5D is a perspective view of the dental implant with the secondary part of FIG. 5A fixed thereon by means of a connection screw.
Figure 5E:
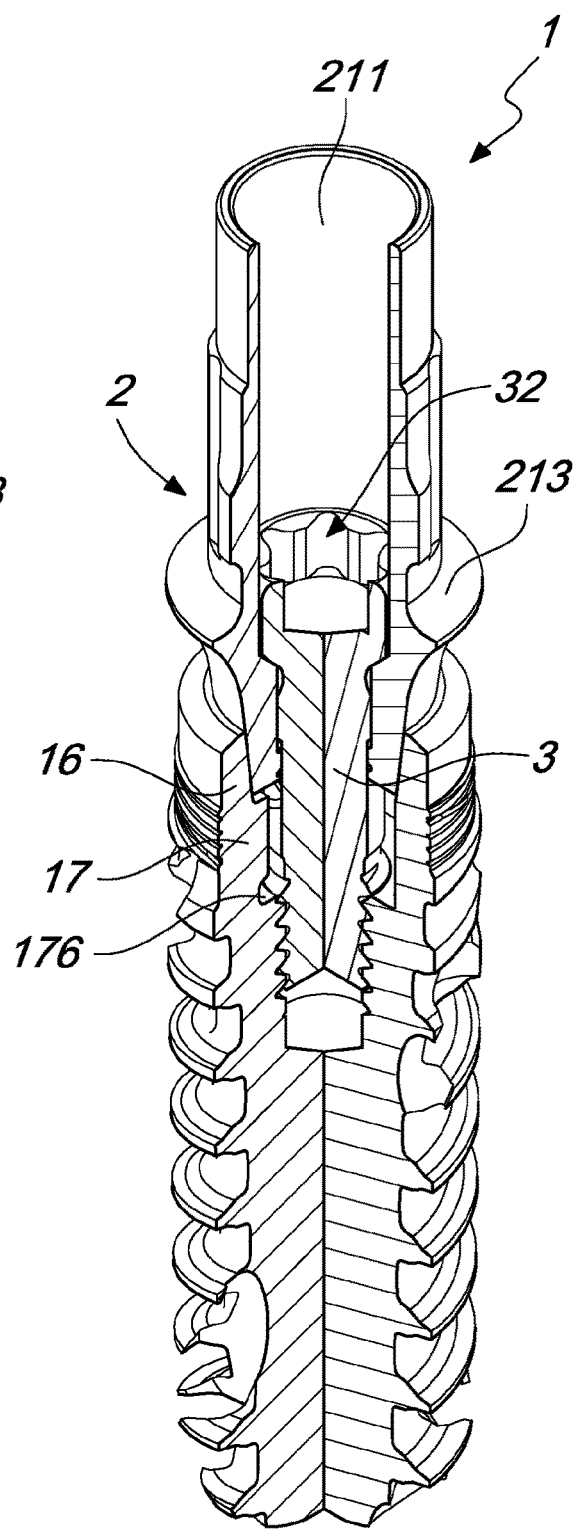
FIG. 5E is a broken cross-sectional perspective view of the dental implant of FIG. 5A with the secondary part mounted thereon by means of a connection screw.

The secondary part 2 includes a central through bore 211 that extends along the entire axial extension of the secondary part 2, preferably, as shown in FIGS. 5B and 5E, in a circular symmetrical manner (namely in the shape of a straight cylinder) around the axis A of the secondary part 2 of the axis A of the dental implant 1 when the secondary part 2 is assembled with the dental implant 1. Nevertheless, as is well-known in the art, the central through bore 211 of the secondary part 2 may have other configurations like being inclined with respect to the axis A and/or it may have other shapes, for instance elliptical in cross-section along a plane perpendicular to the axis A.

The coronal section 21 of the secondary part 2 further optionally includes means 212 for rotationally positioning a dental prosthesis like a dental crown or a dental bridge which are not shown in the drawings of this application. As is known in the art, such means 212 may also be adapted to facilitate the cementing of a dental prosthesis like a dental crown or a dental bridge on the coronal section 21 of the secondary part 2.

Furthermore, the coronal section 21 of the secondary part 2 also includes a supporting ledge designated by reference numeral 213 for the placement of a dental prosthesis thereon, such as a dental crown or a dental bridge. The supporting ledge 213 may have a circular extension along the axis A of the secondary part which is coincident with the axis A of the dental implant 1 in the inserted state of the secondary part 2, as shown in FIGS. 5A and 5B, and has preferably a constant radial width. Nevertheless, the person skilled in the art will appreciate that the width and shape of the supporting ledge 213 may be varied to suit the shape and extension of a dental prosthesis such as a dental crown which is placed on the coronal section 21 of the secondary part 2 and thus supported by the ledge 213. Also the width and shape of the supporting ledge 213 are adapted to ensure a good sealing with the dental prosthesis or the dental bridge, which is essential for avoiding the penetration of liquids into the gaps between the secondary element and the dental prosthesis or the dental bridge.

With further reference to FIG. 5B the stabilizing section 22 of the secondary part 2 is shaped, in an apical part thereof, which is designated by reference numeral 222, such that is exactly complementary to the stabilizing section 16 of the dental implant 1. Accordingly, at least the apical part 222 of the stabilizing section 22 of the secondary part 2 is shaped as a truncated cone flaring out in a coronal direction of the secondary part 2 and has a flaring angle of 5 degrees to 7.9 degrees, more preferably of 5 degrees to 7.7 degrees, even more preferably 5 degrees to 7 degrees and most preferably 7 degrees with respect to the axis A of the secondary part 2 (or of the dental implant 1 when the secondary part 2 is inserted therein). Obviously the exact complementarity of the shape of the apical part 222 of the stabilizing section 22 of the secondary part 2 to the stabilizing section 16 of the dental implant 1 needs to be maintained at least along an axial extension corresponding to the fully inserted state of the secondary part 2 into the dental implant 1. Accordingly, the present invention provides for a highly stable connection between the dental implant 1 and the secondary part 2 combined with an optimal sealing between the dental implant 1 and the secondary part 2 as well as an optimal self-locking effect of the secondary part 2 on the dental implant 1.

The coronal part 221 of the stabilizing section 22 may be extended outwardly as compared to a truncated cone of the apical part 222, such as to allow the formation of the supporting ledge 213 with a larger radial extension, which is beneficial to the supporting function and stability of a dental prosthesis. Furthermore, the sealing with the dental prosthesis may be improved, as has been mentioned, by the larger radial extension of the supporting ledge 213.

At the apical end of the stabilizing section 22 an O-ring designated by reference numeral 224 may be advantageously provided. The O-ring 224 may be disposed on the platform 177 at the coronal end of the drive and indexing section 17, as shown in FIGS. 5B and 5C, and has the function of further improving the sealing between the stabilizing section 22 of the secondary part 2 and the dental implant 1. Alternatively or in addition to the shown position, to the shown position, an O-ring can also be disposed further coronally in the stabilizing section 16 of the dental implant 1 or in the stabilizing section 22 of the secondary part 2. The alternative with an O-ring placed in the stabilizing section 22 of the secondary part 2 is shown in FIG. 5B at reference numeral 225.

The O-ring 224 has a conventional design and is manufactured preferably from titanium, a titanium alloy, an elastomeric material or other different materials known to the person skilled in the art.

The advantageous function of the O-ring 224 is that of stopping any fluids, which may contain bacteria or the like, from penetrating into the internal blind bore of the dental implant 1. Accordingly, by providing for a barrier against the penetration of bacteria and the like, the O-ring 224 minimizes the risk of an infection or an inflammation. Alternatively, in an embodiment which is not shown in FIG. 6A, the O-ring 224 could be placed between apical part of the stabilizing section 22 and the stabilizing section 16.

Figure 6A:
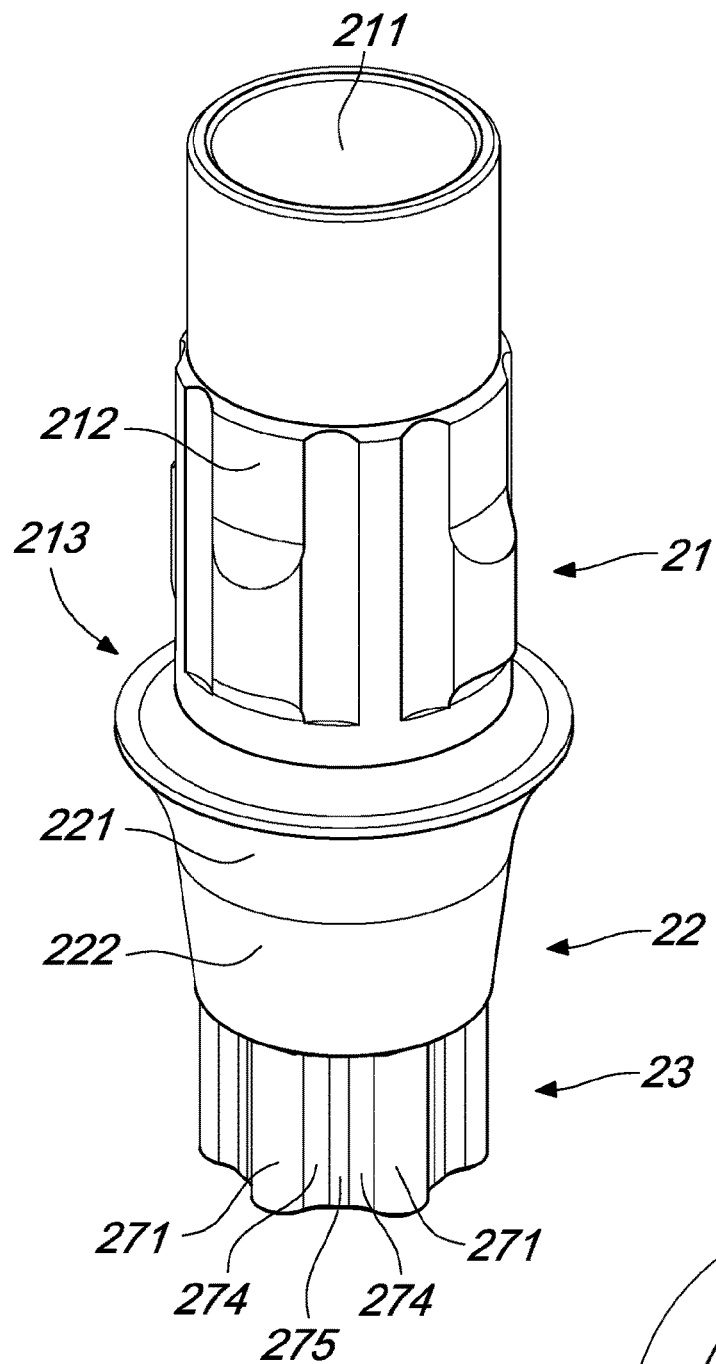
FIG. 6A is a perspective view of the secondary part according to the present invention adapted to be received in the dental implant shown in FIGS. 1 through 5E.
Figure 6B:
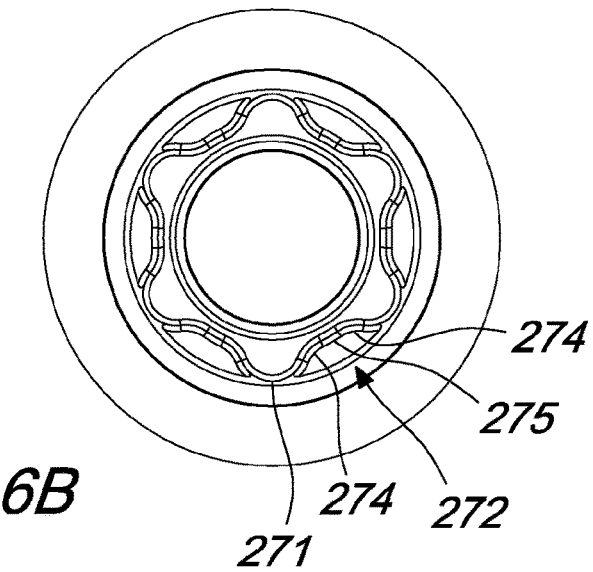
FIG. 6B is a bottom view of the secondary part according to the present invention adapted to be received in the dental implant shown in FIGS. 1 through 5E.

The indexing section 23 of the secondary part 2 has an axial profile with lobes exactly matching the lobes of the drive and indexing section 17 of the internal blind bore of the dental implant 1. In particular, as shown in FIGS. 6A and 6B, the indexing section 23 of the secondary part 2 is provided with a plurality of connecting lobes 271 having a convex shape (which is complementary to the concave shape of the connecting lobes 171 of the drive and indexing section 17 of the dental implant 1) and extending substantially along the entire axial extension of the indexing section 23 of the secondary part 2. This extension corresponds to the extension of the connecting lobes 171 of the drive and indexing section 17 of the internal blind bore of the dental implant 1. Preferably, the connecting lobes 271 are also parts of respective cylinders with a lateral area that is parallel to the axis A of the secondary part 2 (or the axis A of the dental implant 1 when the secondary part 2 is inserted into the dental implant 1). Further, also preferably, the cylinder parts defining the connecting lobes 271 may be embodied as half-cylinders.

In the particular embodiment shown in FIGS. 6A and 6B the number of connecting lobes 271 is equal to six, but the person skilled in the art will appreciate that the number of connecting lobes 271 can be varied according to the number of indexing positions of the secondary part 2 on the dental implant 1. In fact, as will be appreciated by the person skilled in the art, a higher number of connecting lobes 271 will allow a more accurate indexing or rotational positioning of the secondary part 2 on the dental implant 1. Nevertheless, the provision of a larger number of connecting lobes 271 puts a higher burden on the manufacturing process of the secondary part 2. The inventor of the present application has found, as has been explained in connection with the drive and indexing section 17 of the internal blind bore of the dental implant 1, that a number of six connecting lobes 271, as illustrated for instance in FIG. 6B, is preferred since it balances best the constraints pertaining to the indexing, the mechanical stability, the torque resistance and the manufacturing complexity of the indexing section 23 of the secondary part 2 (and also obviously pertaining to the complementarily devised drive and indexing section 17 of the dental implant 1).

With particular reference to FIGS. 6A and 6B it can be seen that the connecting lobes 271 of the indexing section 23 of the secondary part 2 are interconnected by respective lobe linking areas which are generally designated by reference numeral 272. Each of the lobe linking areas 272 has the same axial extension as the connecting lobes 271.

In the embodiment of the indexing section 23 of the secondary part 2 wherein the number of connecting lobes 271 is equal to six, the number of interposed lobe linking areas 272 is also equal to six.

In a preferred variation which is not shown in FIGS. 6A and 6B, an apical portion of each the lobe linking areas 272 may include respective cutouts conforming to the step-like configuration of the respective apical portion 173 of the lobe linking areas 172 of the drive and indexing section 17 of the dental implant 1. Accordingly, the shape of each cutout is preferably inverse-step like. In the latter preferred variation the number of apical portions of the lobe linking areas 272 is also equal to six so as to match the number of lobe linking areas 272 (and the number of connecting lobes 271) in the indexing section 23.

In the embodiments with the cutouts in the lobe linking areas 272 of the indexing section 23, the respective lateral surfaces of the apical portions are parts of a lateral cylinder surface which has an axis coincident with the axis A of the secondary part 2 or the axis A of the dental implant 1 when the secondary part 2 is inserted in the dental implant 1. Nevertheless, according to a variation of the foregoing, the respective lateral surfaces of the apical portions can also be parts of a truncated cone having an axis coincident with the axis A of the secondary part 2 (or the axis A of the dental implant 1 when the secondary part 2 is inserted in the dental implant 1). Each of the cutouts in the apical portion of the lobe linking areas 272 of the indexing section 23 of the secondary part 2 extends in a radial direction towards the axis A of the secondary part 2 for receiving a respective ledge 1732 of the drive and indexing section 17 of the dental implant 1. The cutouts may extend in a radial direction that is substantially perpendicular to the axis A of the secondary part 2 (or the axis A of the dental implant 1 when the secondary part 2 is inserted in the dental implant 1) or has an inclination with respect to the same, in order to match the conformation of the respective ledges 1732 of the drive and indexing section 17 of the dental implant 1.

Generally, as shown in FIGS. 6A and 6B, the axial extensions of the connecting lobes 271 and of the lobe linking areas 272 of the secondary part 2 are equal. This means that in the embodiments of the dental implant 1 with the step-like apical portion 173, the axial extensions of the connecting lobes 271 and of the lobe linking areas 272 of the secondary part 2 are shortened so as to match the axial extension of the lobe linking areas 172 of the dental implant 1 up to the step-like apical portion 173 of the dental implant 1. Otherwise, if the step-like apical portion 173 is missing in the dental implant 1, the axial extensions of the connecting lobes 271 and of the lobe linking areas 272 of the secondary part 2 may be equal to the axial extensions of the connecting lobes 171 and of the lobe linking areas 172 of the dental implant 1. Nevertheless, even in the cases where the step-like apical portion 173 in the dental implant 1 is missing, the axial extensions of the connecting lobes 271 and of the lobe linking areas 272 of the secondary part 2 may be shorter than the axial extensions of the connecting lobes 171 and of the lobe linking areas 172 of the dental implant 1 to a degree that still ensures the stability of the connection between the dental implant 1 and the secondary part 2.

In the embodiments of the secondary part 2 that include the cutouts in the apical portion of the lobe linking areas 272 of the indexing section 23 of the secondary part 2, the axial extension of the connecting lobes 171 of the drive and indexing section 17 of the dental implant 1 and the axial extension of the connecting lobes 271 of the indexing section 23 of the secondary part 2 may be equal. In other words, in this case, the axial extension of the drive and indexing section 17 of the dental implant 1 may be equal to the axial extension of the indexing section 23 of the secondary part 2.

Nevertheless, in all above embodiments, irrespectively of the respective axial extensions, a tight seal between the stabilizing section 16 of the dental implant 1 and the stabilizing section 22 of the secondary part 2 must be maintained.

The embodiments including the cutouts in the lobe linking areas 272 of the indexing section 23 of the secondary part 2 which cooperate with step-like apical portions 173 of the dental implant 1 advantageously provide the function of guiding the secondary part 2 when the same is connected to the dental implant 1. This guiding function is particularly advantageous in the case of a click-in connection. It is also particularly advantageous in this context if the cutouts are inclined in the apical direction, as compared to a plane perpendicular to the axis A of the secondary part 2 (or the dental implant 1 in the inserted state of the secondary part 2), such that a sliding surface is provided for the click-in connection or the connection in general if the click-in feature is missing. For instance, advantageously, the inclination with respect to the plane perpendicular to the axis A of the secondary part 2 (or the dental implant 1 in the inserted state of the secondary part 2) may be less than 30 degrees, more preferably less than 20 degrees and most preferably less than 10 degrees.

As shown in FIGS. 6A and 6B each of the lobe linking areas 272 of the indexing section 23 of the secondary part 2 is formed, according to the invention, generally with a concave shape further including a central section that has a convex shape. Thus, as is apparent, the general outline defined by the connecting lobes 271 and the lobe linking areas 272 of the indexing section 23 of the secondary part 2 has the "modified torx" described in connection with the dental implant 1 of FIGS. 1 through 4.

In FIGS. 6A and 6B the convex section of a lobe linking area 272 of the indexing section 23 of the secondary part 2 is designated by reference numeral 275 while the adjacent two concave sections of a lobe linking area 272 of the indexing section 23 of the secondary part 2 are designated by reference numeral 274. The outline and extension of the convex and concave sections of the lobe linking area 272 of the indexing section 23 of the secondary part 2 exactly follow the outline and extension of the corresponding sections of the lobe linking area 172 of the dental implant 1.

Generally, the lateral areas of the sections of the lobe linking areas 272 of the indexing section 23 of the secondary part 2 are also parts of respective cylinders and extend, similarly to the lateral areas of the connecting lobes 271 of the indexing section 23 of the secondary part 2, in parallel to the axis A of the secondary part 2 or of the dental implant 1 when the secondary part 2 is inserted into the dental implant 1.

Otherwise, as regards the connecting lobes 271 and lobe linking areas 272 of the indexing section 23 of the secondary part 2, the same advantages and constructive details are applicable as set out in connection with the connecting lobes 171 and lobe linking areas 172 of the drive and indexing section 17 of the dental implant 1, with the exception of the advantages set out in connection with the interaction with an insertion tool.

With renewed reference to FIGS. 5B, 5C and 5E it can be seen that the secondary part 2 is secured to the dental implant 1 by means of a connection or securing screw designated by reference numeral 3. The connection screw 3 interacts in a known manner with the internal thread 182 of the apical internally threaded section 18 of the dental implant 1 and has an enlarged head 31 which is dimensioned to engage in its screwed state a truncated cone-shaped internal section 24 of the secondary part 2. The enlarged head 31 of the connection screw 3 is provided with wrench engaging means 32 (which are embodied for instance as an internal hex, an internal square or another driving surface) such that the wrench engaging means 32 can interact with an insertion tool or a wrench (which are not shown) for screwing and securing the connection screw 3 to the dental implant 1 with the secondary part 2 being firmly held in the internal blind bore of the dental implant 1. The wrench engaging means 32 are designed in such a manner that an insertion tool or a wrench (which is not shown) can engage the connection screw 3 either along a longitudinal axis thereof or in an angled manner with an angle as compared to the longitudinal axis of the connection screw 3 from 0 degrees up to 25 degrees. In this secured state the indexing section 23 of the secondary part 2 is fully inserted in the corresponding drive and indexing section 17 of the dental implant 1.

At the same time, in the secured state, the stabilizing section 22 of the secondary part 2 closely fits the stabilizing section 16 of the dental implant 1 to seal the connection between the secondary part 2 and the dental implant 1. Additionally, a supplementary O-ring (not shown on FIG. 5B) may be attached to connection screw 3 to seal against the secondary part 2. In this way, by providing for a barrier against the penetration of bacteria and the like, the supplementary O-ring minimizes the risk of an infection and/or an inflammation With reference to FIGS. 7A through 7D a dental implant 1' with a secondary part 2' mounted thereon is shown, wherein both the dental 'implant 1' and the secondary part 2' are different from the implant and the secondary part of FIGS. 1 through 6B, as will be discussed more in detail hereinafter. This secondary part 2' is also advantageously embodied as an abutment, in particular as an abutment for supporting a single replacement tooth or a dental bridge.

As far as the dental implant 1' is concerned, its construction is the same as that of the dental implant of FIGS. 1 through 5E, except for the flutes 141', the number of which equals three. Accordingly any further detailed description of the dental implant 1' will be omitted and the same reference numerals are used as in FIGS. 1 through 5E for identical overlapping features. The increased number of flutes facilitates the insertion of the dental implant 1' into the bone of a patient, as the additional flute provides for additional pathways to expel the bone material cut during the insertion of the dental implant into the bone tissue.

Turning now to the secondary part 2' of FIGS. 7A through 7D, such modified secondary part 2' which may be used for molar single crown restorations includes, in a manner similar to the secondary part of FIGS. 5A through 5E and 6A to 6B, a coronal section 21, followed further apically by the stabilizing section 22 and by the indexing section 23.

Otherwise, the secondary part 2' of FIGS. 7A through 7E is identical to the secondary part of FIGS. 5A through 5E and 6A to 6B, except for the difference discussed hereinafter.

Accordingly any further detailed description of the features of the secondary part 2' of FIGS. 7A through 7D which are identical to the features of the secondary part 2 of FIGS. 5A through 5E and 6A to 6B will be omitted and the same reference numerals are used for indicating said identical features.

The supporting ledge 213' of the secondary part 2' of the embodiment of FIGS. 7A through 7D is wider than the supporting ledge 213 of the secondary part 2 of the embodiment of FIGS. 5A through 5E and 6. Also in the embodiment of FIGS. 7A through 7D the ledge 213' is intended for the placement of a dental prosthesis thereon, such as a dental implant or a dental crown. The supporting ledge 213' may have a circular extension along the axis A of the secondary part 2' (or the dental implant if the secondary part is inserted into the same), as shown in FIGS. 7A through 7D, and has preferably a constant radial width. Nevertheless, the person skilled in the art will appreciate that the width and shape of the supporting ledge 213' may be varied to suit the shape and extension of a dental prosthesis such as a dental crown which is placed on the coronal section 21 of the secondary part 2' in line with the criteria set out in connection with the embodiment of FIGS. 1 through 5E.

Figures 7A, 7B:
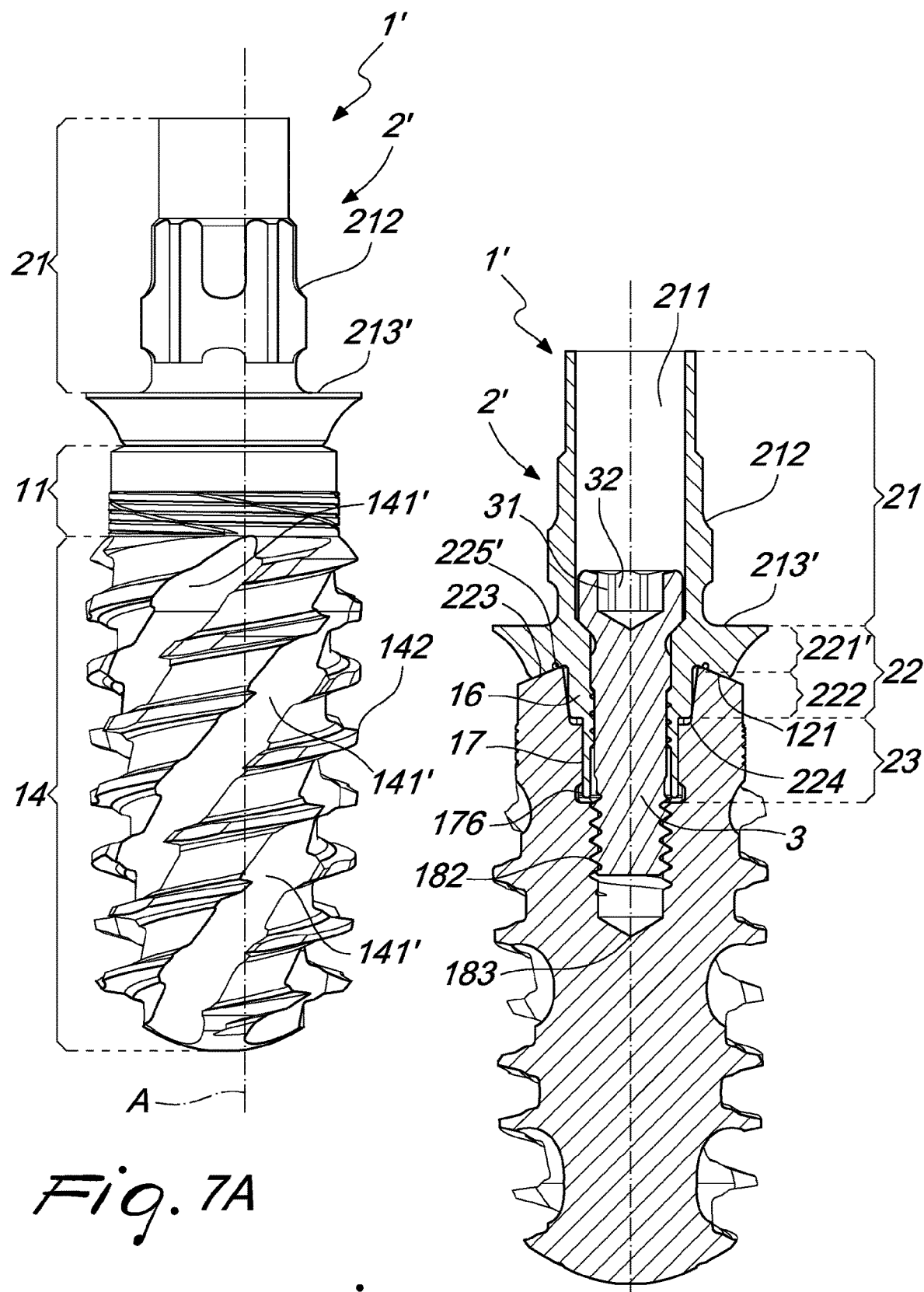
FIG. 7A is a side view of a dental implant which is variated as compared to the dental implant of FIGS. 1 through 4 with a secondary part mounted thereon which is also different from the secondary part of FIGS. 5A through 5E.
FIG. 7B is a cross-sectional view of the dental implant of FIG. 7A with the secondary part mounted thereon.
Figure 7C:
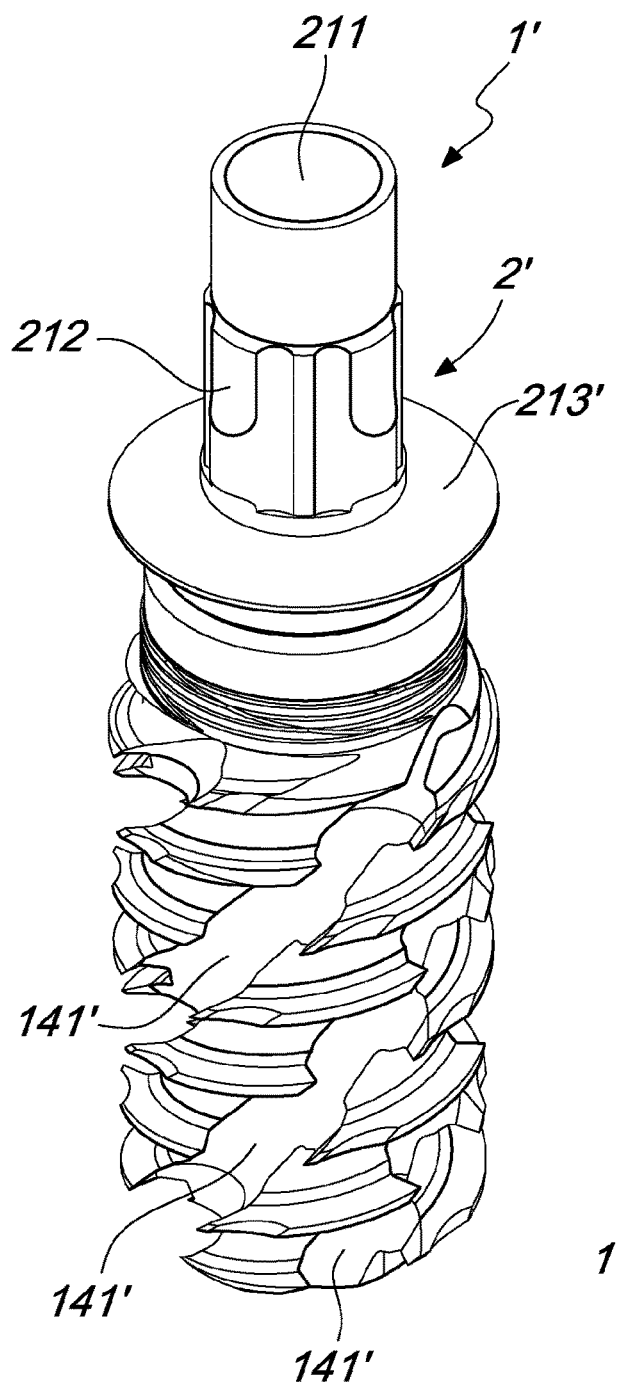
FIG. 7C is a perspective view of the dental implant of FIG. 7A with the secondary part threadingly fixed thereon by means of a connection screw.
Figure 7D:
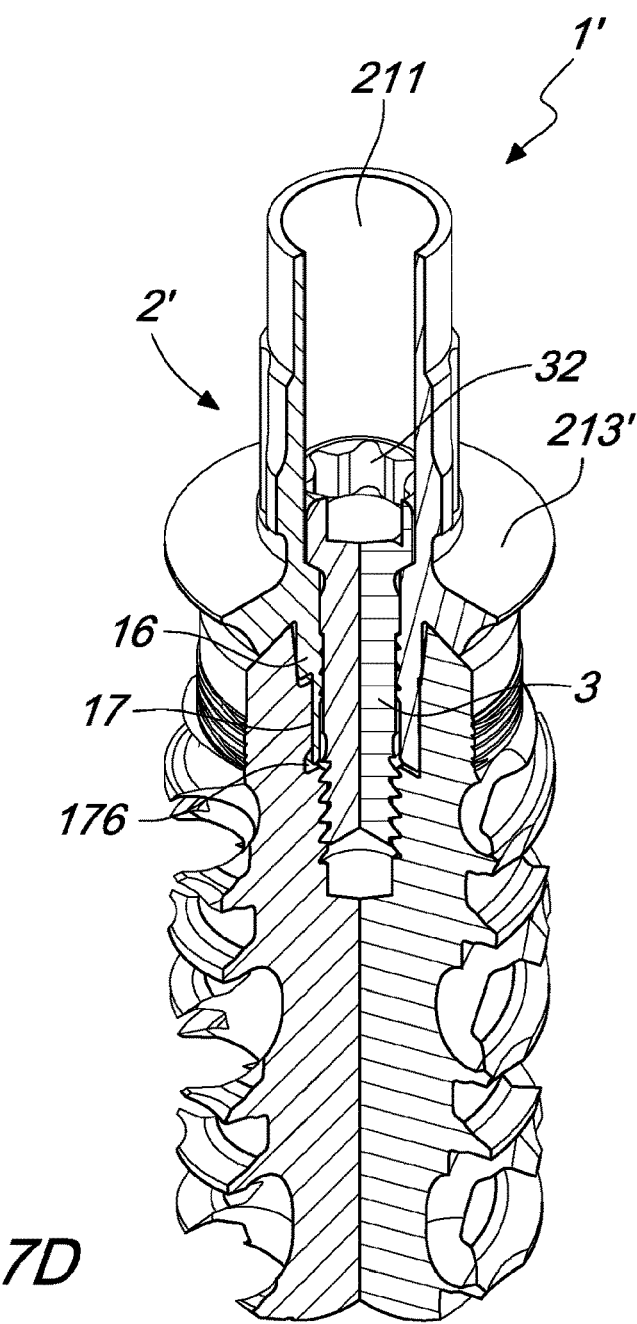
FIG. 7D is a broken cross-sectional perspective view of the dental implant of FIG. 7A with the secondary part mounted thereon by means of a connection screw.

With further reference to FIG. 7B the stabilizing section 22 of the secondary part 2' includes the apical part 222 which has the same shape as the apical part 222 described in connection with FIGS. 5A through 5E and 6A to 6B. However, the coronal part 221' of the stabilizing section 22 of the secondary part 2' has a widened configuration as compared to the coronal part 221 of the stabilizing section 22 of the secondary part 2 of FIGS. 5A through 5E and 6A through 6B in order to define the wider supporting ledge 213'.

Furthermore, as shown in FIG. 7B, at the interface between the coronal part 221' of the stabilizing section 22 of the secondary part 2' and the apical part 222 of the stabilizing section 22 of the secondary part 2', a beveled surface 223 is defined which has a generally truncated cone outline that follows the outline of the beveled part 121 of the smooth section 12 of the coronal section 11 of the dental implant 1. The beveled surface 223 of the stabilizing section 22 of the secondary part 2' advantageously provides for a more stable connection between the dental implant (having a matching configuration) and the superimposed secondary part. Further, the beveled surface 223 also provides for a better sealing between the dental implant and the superimposed secondary part.

As has been described with respect to the beveled part 121 of the dental implant 1, the beveled surface 223 of the secondary part 2' has an angle of 17 to 27 degrees, more preferably an angle of 20 to 24 degrees and most preferably an angle of 22.5 degrees with respect to a plane that is perpendicular to the axis A of the secondary part 2' (or the axis A of the dental implant 1' when the secondary part 2' is inserted into the dental implant 1'). The latter most preferred inclination angle of the beveled surface 223 of the secondary part 2' in conjunction with the matching inclination angle of the beveled part 121 of the dental implant 1 is particularly advantageous in terms of mechanical stability and sealing when the dental implant is connected to the superimposed secondary part which may be embodied, for instance, as an abutment.

An additional O-ring (which is not shown in the figures) may be provided between the beveled part 121 of the smooth section 12 of the coronal section 11 of the dental implant 1 and the beveled surface 223 of the stabilizing section 22 of the secondary part 2'. The added O-ring additionally improves the sealing between the dental implant and the superimposed secondary part. Advantageously, the additional O-ring is placed at the flat shoulder 122 of the dental implant 1 which is adjacent to the beveled part 121 of the dental implant 1. In a further alternative, the additional O-ring may be placed at the beveled part 121 of the smooth section 12 of the coronal section 11 of the dental implant 1, such that it provides for additional sealing between the beveled part 121 and the beveled surface 223 of the stabilizing section 22 of the secondary part 2'. In a further variation, the additional O-ring can be placed in the secondary part (abutment) 2' at or close to the interface between the coronal part 221' of the stabilizing section 22 and the apical part 222 of the stabilizing section 22 of the secondary part 2'. The latter alternative is shown in FIG. 7B with reference numeral 225'. In certain embodiments, any combinations of the additional O-rings can be included. The additional O-ring has a conventional design, is manufactured preferably from titanium, a titanium alloy, an elastomeric material or other different materials known to the person skilled in the art and has a function similar to that of the previously described O-ring 224. Furthermore, in the embodiment of FIGS. 7A through 7B the O-ring 224 can also be included alone or in combination with the additional O-ring.

Finally, with reference to the embodiment of FIGS. 7A through 7D, the connection screw 3 is the same as the connection screw depicted in FIGS. 5A through 5E, and therefore its detailed description will be omitted.

Figure 7E:
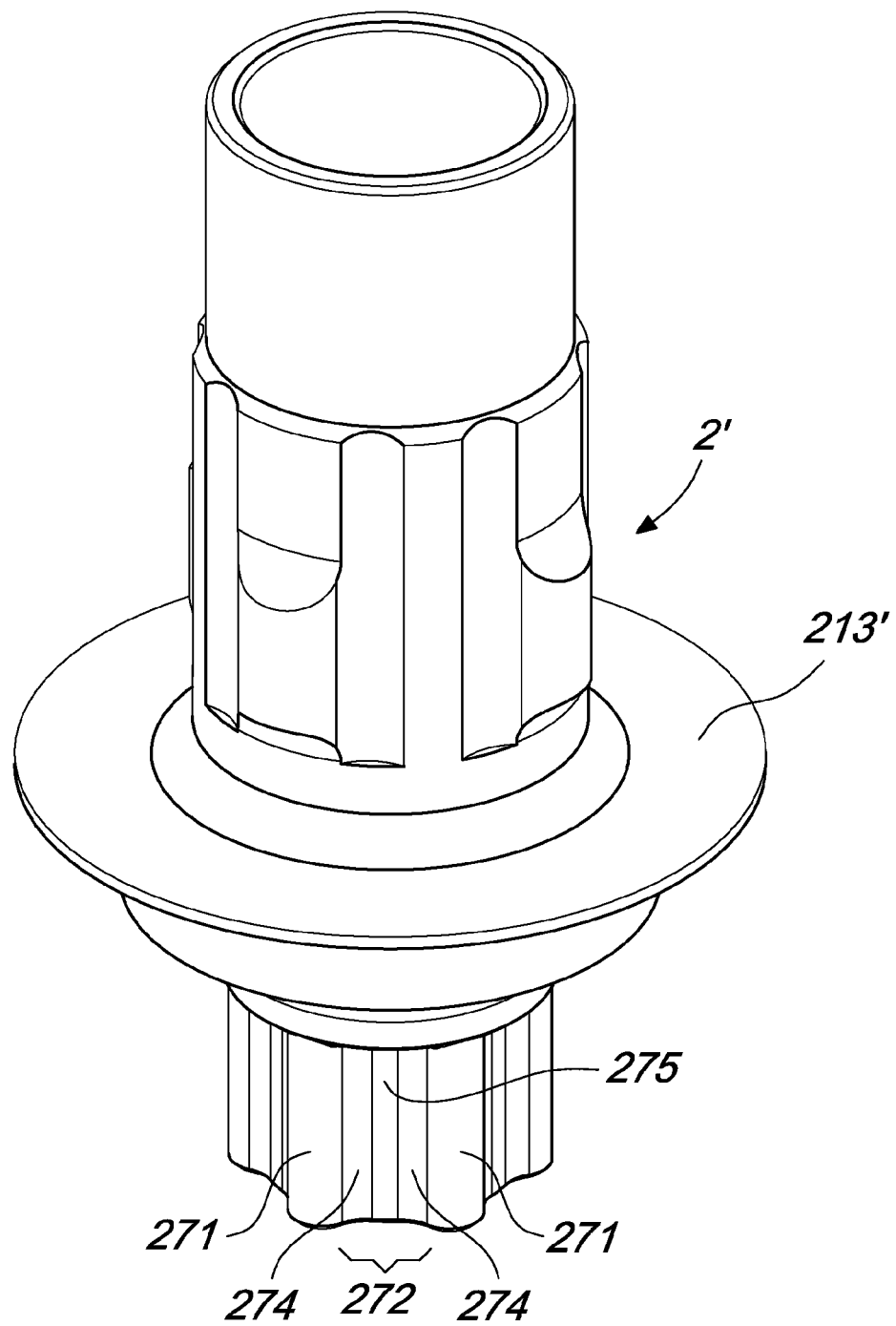
FIG. 7E is a perspective view of the secondary part of FIGS. 7A through 7D.

A perspective view of the secondary part 2' of FIGS. 7A through 7D is shown in FIG. 7E. The secondary part 2' of FIG. 7E is the same as the secondary part 2 of FIGS. 6A and 6B except for the supporting ledge 213' and the coronal part 221' of the stabilizing section 22 which is embodied as shown in FIGS. 7A through 7D. Therefore, the detailed description of the secondary part 2' of FIG. 7E will be omitted.

FIGS. 8A through 8D show a dental implant with an insertion tool inserted therein. The insertion tool can be used, as is well-known in the art, to drive the dental implant into the bone of a patient.

As far as the dental implant 1 is concerned, its construction is the same as that of the dental implant of FIGS. 1 through 4, and accordingly a further detailed description thereof will be omitted.

The insertion tool, which is designated by reference numeral 4, includes a coronal section 41 having a shank portion 411, which can be connected to a rotary machine (not shown) by means of an appropriate engagement element 414. The engagement element 414 may have any appropriate shape for engaging a rotary machine or a manual drive for the tool including a polygonal, for instance hexagonal, configuration. The coronal section 41 of the insertion tool 4 also includes a manual tool engagement section 412 configured to engage a manual torque applying tool (e.g., a wrench) which is also not shown. Preferably the manual tool engagement section 412 is hexagonal with each side of the hexagon including a plurality of recesses 413, preferably of a substantial conical configuration, for the engagement with the manual tool. The recesses 413 may additionally serve to recognize the angular position of the dental implant 1 during its insertion into the bone tissue. Further, additional means which are well-known to the person skilled in the art may be provided on the insertion tool 4 to enable the recognition of the angular position of the dental implant 1 in the bone tissue during its insertion.

The insertion tool 4 further includes an apical section 42 for the engagement with the internal bore of the dental implant 1. The apical section 42 of the insertion tool 4 includes from its coronal to its apical end a first stabilizing section 421, a drive section 422 and a second stabilizing section 423.

With further reference to FIGS. 8B and 8D as well as FIG. 9 the first stabilizing section 421 of the apical section 42 of the insertion tool 4 has a shape exactly complementary to that of the stabilizing section 16 of the dental implant 1. Accordingly, the first stabilizing section 421 of the apical section 42 of the insertion tool 4 is shaped as a truncated cone flared outwardly in a coronal direction of the insertion tool 4 and having a flaring angle of 5 degrees to 7.9 degrees, more preferably of 5 degrees to 7.7 degrees, even more preferably of 5 degrees to 7 degrees and most preferably 7 degrees, with respect to the axis A of the insertion tool 4 (or of the dental implant 1 when the insertion tool 4 is inserted therein). Accordingly, the present invention provides for a highly stable connection between the dental implant 1 and the insertion tool 4 as well as an optimal self-locking effect of the insertion tool 4 on the dental implant 1.

The drive section 422 of the apical part 42 of the insertion tool 4 has an axial profile with lobes exactly matching the outline of the lobes of the drive and indexing section 17 of the internal blind bore of the dental implant 1. In particular, as shown in FIG. 9, the drive section 422 of the apical part 42 of the insertion tool 4 is provided with a plurality of connecting lobes 471 having a convex shape (which is complementary to the concave shape of the connecting lobes 171 of the drive and indexing section 17 of the dental implant 1) and extending substantially along the entire axial extension of the drive section 422 of the apical part 42 of the insertion tool 4. This extension corresponds substantially to the extension of the connecting lobes 171 of the drive and indexing section 17 of the internal blind bore of the dental implant 1. Preferably, the connecting lobes 471 of the drive section 422 of the insertion tool 4 are also parts of respective cylinders with a lateral area that is parallel to the axis A of the insertion tool 4 (or the axis A of the dental implant 1 when the insertion tool 4 is inserted into the dental implant 1). Further, also preferably, the cylinder parts defining the connecting lobes 471 of the drive section 422 of the insertion tool 4 may be embodied as half-cylinders.

In the particular embodiment shown in FIG. 9 the number of connecting lobes 471 of the drive section 422 of the insertion tool 4 is equal to six, but the person skilled in the art will appreciate that the number of connecting lobes 471 can be varied according to the number of indexing positions of the insertion tool 4 on the dental implant 1. However, the provision of a larger number of connecting lobes 471 on the insertion tool 4 puts a higher burden on the manufacturing process of the insertion tool 4. The inventor of the present application has found, as has been explained in connection with the drive and indexing section 17 of the internal blind bore of the dental implant 1, that a number of six connecting lobes 471, as illustrated for instance with respect to the insertion tool of FIG. 9, is preferred since it balances best the constraints pertaining to the mechanical stability, the torque resistance and the manufacturing complexity of the drive section 422 of the insertion tool 4 (and also obviously pertaining to the complementarily devised drive and indexing section 17 of the dental implant 1).

With further particular reference to FIG. 9 in addition to FIGS. 8A to 8D it can be seen that the connecting lobes 471 of the drive section 422 of the insertion tool 4 are interconnected by respective lobe linking areas which are generally designated by reference numeral 472. As in the case of the drive and indexing section 17, each of the lobe linking areas 472 of the drive section 422 of the insertion tool 4 has the same axial extension as the connecting lobes 471. In the embodiment shown in FIG. 9, preferably, a circular recess 488 is formed in the connecting lobes 471 and the lobe linking area 472. The circular recess 488 is formed peripherally around the axis A of the insertion tool 4 and divides the drive section 422 of the insertion tool 4 into a coronal part 4221 and an apical part 4222. The circular recess 488 is adapted to house a resilient O-ring or a split C-ring 489 (shown in FIG. 8B) for engaging the dental implant 1 with less force, such that the insertion tool 4 can be disengaged from the dental implant 1 easily after insertion into the bone. On the other hand the resilient O-ring or the split C-ring 489, by wedging into the corresponding section of the dental implant, provides for a sufficient engagement force that the dental implant 1 is held in the insertion tool 4 and does not fall off during transport to the patient's mouth. The resilient O-ring or the split C-ring 489 has a conventional design and is manufactured preferably from titanium, a titanium alloy, an elastomeric material or other different materials known to the person skilled in the art.

In a variation which is not shown in the drawings, the apical part 4222 of the drive section 422 of the insertion tool 4 may be devised with a cylindrical shape. The cylindrical shape may also be replaced by any alternative geometrical form appropriate to hold the resilient O-ring or the split C-ring 489 in place on the insertion tool 4. Nevertheless, the outline shown in FIG. 9 with the connecting lobes 471 and the lobe linking areas 472 in the apical part 4222 of the drive section 422 of the insertion tool 4 is advantageous, inasmuch as it allows the arrangement of the circular recess 488 at a higher coronal location in the drive section 422 of the insertion tool 4 while retaining a sufficient engagement surface of the drive section 422 of the insertion tool 4 with the drive and indexing section 17 of the dental implant 1.

According to a further alternative embodiment of the insertion tool 4, which is also not shown in FIG. 9, the resilient O-ring or the split C-ring is omitted and in this case the connecting lobes 471 and the lobe linking areas 472 may extend uninterruptedly throughout the whole longitudinal extension of the drive section 422 of the insertion tool 4.

According to the latter preferred alternative which is also not shown in FIG. 9, when the resilient O-ring or the split C-ring is omitted, the apical portion of the lobe linking areas 472 of the insertion tool 4 may have a cutout conforming to the step-like configuration of the apical portion 173 of the lobe linking areas 172 of the drive and indexing section 17 of the dental implant 1. Accordingly, the shape of each cutout is preferably inverse-step-like. As in the case of the secondary part 2 including cutouts the respective lateral surfaces of the apical portions of the lobe linking areas 472 of the insertion tool 4 in the latter preferred embodiment may be part of a lateral cylinder surface which has an axis coincident with the axis A of the insertion tool 4 or the axis A of the dental implant 1 when the insertion tool 4 is inserted in the dental implant 1. Nevertheless, according to a variation of the foregoing, the respective lateral surfaces of the apical portions of the lobe linking areas 472 can be part of a truncated cone having an axis that is coincident with the axis A of the insertion tool 4 (or the axis A of the dental implant 1 when the insertion tool 4 is inserted in the dental implant 1). In any case the cutouts extend in a radial direction towards the axis A of the insertion tool 4 (or the axis A of the dental implant 1 when the insertion tool 4 is inserted in the dental implant 1). The cutouts may extend in a radial direction that is substantially perpendicular to the axis A of the insertion tool 4 (or the axis A of the dental implant 1 when the insertion tool 4 is inserted in the dental implant 1) or with an inclination to the same, in order to match the conformation of the respective ledges 1732 of the drive and indexing section 17 of the dental implant 1. Clearly otherwise, in all embodiments described above, the apical portion of the lobe linking areas of the drive section of the insertion tool 4 may have a shape that is complementary to the shape of the apical portion 173 of the lobe linking areas 172 of the drive and indexing section 17 of the dental implant 1.

Further, according to the latter preferred alternative, when the cutouts are provided, each of the apical portions of the lobe linking areas 472 of the drive section 422 of the insertion tool 4 having the respective inverse-step-shaped cutout advantageously provides for the function of guiding an insertion tool 4 when the same is inserted in the dental implant 1. This guiding function is particularly advantageous in the case of a click-in connection. It is also particularly advantageous in this context if the cutouts are inclined in the apical direction, as compared to a plane perpendicular to the axis A of the insertion tool 4 (or the dental implant 1 in the inserted state of the insertion tool), such that a sliding surface is provided for the click-in connection or the connection in general if the click-in feature is missing. For instance, advantageously, the inclination with respect to the plane perpendicular to the axis A of the insertion tool 4 (or the dental implant 1 in the inserted state of the insertion tool) may be less than 30 degrees, more preferably less than 20 degrees and most preferably less than 10 degrees.

The click-in connection of the dental implant 1 with the insertion tool 4 may be implemented by means of a radially flaring section provided at the apical end of the drive section 422 of the insertion tool 4, in particular at the apical part 4222, which can be engaged in the undercut 176 of the drive and indexing section 17 of the dental implant 1. The click-in connection of the secondary part 2 with the dental implant 1 can be implemented in a similar manner.

Furthermore, as regards all embodiments of the insertion tool 4 the following should be noted:

In the embodiment of the drive section 422 wherein the number of connecting lobes 471 is equal to six, the number of apical portions (if any) of the lobe linking areas 472 (and obviously the number of lobe linking areas 472) is also equal to six. Clearly, also in the drive section 422 of the insertion tool 4, as the lobe linking areas 472 are interposed between the connection lobes 471, their respective numbers will be equal.

As shown in FIG. 9, each of the lobe linking areas 472 of the drive section 422 of the insertion tool 4 is formed generally with a concave shape. This shape, in certain embodiments, will be sufficient to cooperate with the drive and indexing section 17 of the dental implant 1.

Nevertheless, in an alternative which is not shown in FIG. 9, the lobe linking areas 472 of the drive section 422 of the insertion tool 4 may be shaped similar to the lobe linking areas 272 of the indexing section 23 of the secondary part 2 to include a central section that has a convex shape and two adjacent concave sections, such as to be exactly complementary to the shape of the lobe linking areas 172 of the drive and indexing section 17 of the dental implant 1.

While the latter detail is not shown in FIG. 9, it will be appreciated that the general outline defined by the connecting lobes 471 and the lobe linking areas 472 of the drive section 422 of the insertion tool 4 has the "modified torx" described in connection with the dental implant 1 of FIGS. 1 through 4. In particular, each lobe linking area 472 of the drive section 422 of the insertion tool 4 has a central convex section and two adjacent concave sections.

As has been explained, in the embodiment under consideration, the outline and extension of the respective convex and concave sections of the lobe linking areas 472 of the drive section 422 of the insertion tool 4 exactly follow the outline and extension of the corresponding sections of the lobe linking area 172 of the dental implant 1.

Generally, the lateral areas of the sections of the lobe linking areas 472 of the drive section 422 of the insertion tool 4 are also parts of respective cylinders and extend in parallel to the axis A of insertion tool (or of the dental implant 1 when the insertion tool 4 is inserted into the dental implant 1), similarly to the lateral areas of the connecting lobes 471 of the drive section 422 of the secondary part 2.

Otherwise, as regards the connecting lobes 471 and lobe linking areas 472 of the drive section 422 of the insertion tool 4, the same advantages and constructive details as set out in connection with the connecting lobes 171 and lobe linking areas 172 of the drive and indexing section 17 of the dental implant are applicable, with the exception of interaction with a secondary part.

The second stabilizing section 423 of the apical section 42 of the insertion tool 4, which is a further preferred feature in all embodiments thereof, is provided apically of the drive section 422 of the apical section 42 of the insertion tool 4, as shown in FIGS. 8B to 8C and 9.

The second stabilizing section 423, which closely matches the outline of the internal thread 182 of the apical internally threaded section 18 of the dental implant 1, advantageously provides for further stability of the connection between the dental implant 1 and the insertion tool 4. The second stabilizing section 423 of the apical section 42 of the insertion tool 4 has preferably a cylindrical shape (namely the shape of a straight cylinder), and the axial extension of the second stabilizing section 423 along the axis A is preferably equal to at least 1/3 of the axial extension of the internal thread 182 of the apical internally threaded section 18 of the dental implant 1, more preferably equal to at least 1/2 of the axial extension of the internal thread 182, and most preferably equal to at least 2/3 of the axial extension of the internal thread 182.

FIGS. 10A to 10C are views of the dental implant 1 of FIG. 1 with a further different secondary part mounted thereon. The secondary part of FIGS. 10A to 10C is designated by reference numeral 5 and is characterized in that it is threadable to the threaded section 13 of the coronal section 11 of the dental implant 1. Accordingly, the connection screw 3 is missing in the embodiment of FIGS. 10A to 10C and the threadable secondary part 5 includes an internal thread 51 which can be threaded to the threaded section 13 of the coronal section 11 of the dental implant 1. The threadable secondary part 5 of FIGS. 10A to 10C is generally suitable for large implants which support for instance molar single crown restorations or dental bridges. Clearly, the internal thread 51 is provided in a section of the threadable secondary part 5 that is axially symmetric.

The dental implant of FIGS. 10A to 10C is identical to the dental implant 1 of FIGS. 1 through 4 and therefore will not be further discussed herein.

The internal shape of the threadable secondary part 5 of FIGS. 10A to 10C includes an internal beveled surface 52 and advantageously exactly follows the shape of the beveled part 121 of the smooth section 12 of the coronal section 11 of the dental implant 1. In particular, as described with respect to the beveled part 121 of the dental implant 1, the internal beveled surface 52 of the threadable secondary part 5 has an angle of 17 to 27 degrees, more preferably an angle of 20 to 24 degrees and most preferably an angle of 22.5 degrees with respect to a plane that is perpendicular to the axis A of the threadable secondary part 5 (or the axis A of the dental implant 1 when the threadable secondary part 5 is inserted into the dental implant 1). The latter most preferred inclination angle of the internal beveled surface 52 of the threadable secondary part 5 in conjunction with the matching inclination angle of the beveled part 121 of the dental implant 1 is particularly advantageous in terms of mechanical stability and sealing when the dental implant is connected to the superimposed threadable secondary part which may be embodied, for instance, as an abutment, in particular an abutment for supporting a dental bridge. The angular orientation of the latter type of abutment is not necessary.

Otherwise the threadable secondary part 5 has the shape of an axially symmetric rotation body (around the axis A) including a coronal cylindrical section 53, a beveled truncated cone-shaped section 54 and an apical cylindrical section 55. As becomes apparent from FIGS. 10A to 10C, the coronal cylindrical section 53 of the threadable secondary part 5 is smaller in diameter than the apical cylindrical section 55 of the threadable secondary part 5 and the beveled truncated cone-shaped section 54 forms therebetween an apposition surface for a superstructure. Preferably, the beveled truncated cone-shaped section 54 also forms an angle of 17 to 27 degrees, more preferably an angle of 20 to 24 degrees and most preferably an angle of 22.5 degrees with respect to a plane that is perpendicular to the axis A of the secondary part 5 (or the axis A of the dental implant 1 when the secondary part 5 is in place on the dental implant 1). Such inclination angles are advantageous in terms of mechanical stability and sealing when the secondary part is connected to a superimposed structure such as a dental bridge.

With reference to FIGS. 11A to 11C a healing cap for use with the dental implant according to the present invention is shown. The healing cap is designated with reference numeral 6 and is shown on the dental implant 1 in FIGS. 1 through 4. Therefore, the dental implant 1 in FIGS. 11A to 11C will not be further discussed herein.

The healing cap 6 is generally shaped as a rotationally symmetrical rotation body along the longitudinal axis A thereof.

The healing cap 6 has an enlarged head 62 arranged at the coronal end thereof, wherein the enlarged head 62 is provided with wrench engaging means 61 which are embodied for instance as an internal hex, an internal square or another driving surface. Nevertheless, advantageously, wrench engaging means 61 can also be embodied to interact with the drive section 422 of the insertion tool 4 described hereinabove.

The enlarged head 62 of the healing cap 6 is followed further apically by a stabilizing section 63 which matches exactly the stabilizing section 16 of the dental implant 1. The stabilizing section 63 of the healing cap 6 is followed further apically by an intermediate section 64 which may be shaped in one preferred embodiment as a rotationally symmetrical rotation body.

The intermediate section 64 is followed further apically by a threaded section 65 which is adapted to threadingly engage the internal thread 182 of the apical internally threaded section 18 of the dental implant 1.

In an alternative to the above preferred intermediate section 64 and threaded section 65, which is not shown in the drawings of the present application, the intermediate section can also be formed with the "modified" torx outline which follows the outline of the drive and indexing section 17 of the dental implant 1. In the alternative to the intermediate section 64 of the healing cap 6 having the "modified torx" outline (and thus matching the outline of the drive and indexing section 17 of the dental implant 1), the threaded section 65 is omitted and replaced by a bulge-shaped element arranged and dimensioned to be seated in the undercut 176 of the dental implant.

The internal shape of the healing cap of FIGS. 11A to 11C includes an internal beveled surface 66 which, in a preferred implementation, exactly follows the shape of the beveled part 121 of the smooth section 12 of the coronal section 11 of the dental implant 1. In particular, as described with respect to the beveled part 121 of the dental implant 1, the internal beveled surface 66 of the healing cap 6 has an angle of 17 to 27 degrees, more preferably an angle of 20 to 24 degrees and most preferably an angle of 22.5 degrees with respect to a plane that is perpendicular to the longitudinal axis A of the healing cap 6 (or the axis A of the dental implant 1 when the healing cap 6 is inserted into the dental implant 1). The latter most preferred inclination angle of the internal beveled surface 66 of the healing cap 6 in conjunction with the matching inclination angle of the beveled part 121 of the dental implant 1 is particularly advantageous in terms of mechanical stability and sealing. The sealing efficiency of the healing cap 6 with the dental implant 1 is further improved by the particular angular configuration of the stabilizing section 63 of the sealing cap 6 which, as explained above, closely matches the shape and outline of the stabilizing section 16 of the dental implant 1.

Furthermore, according to the present invention, an impression cap is also provided which is devised, in terms of its connection to the internal blind bore of the dental implant, similarly to the healing cap described above.

Clearly, several modifications will be apparent to and can be readily made by the person skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the person skilled in the art. In this regard it is stressed that the dental implant and the secondary part of the invention can be manufactured from ceramics, metal (in particular titanium) and combinations thereof.

Furthermore, while the present invention has been discussed and shown above in various combinations of dental implants and secondary elements, the person skilled in the art will readily understand that each of the dental implants can be combined with each of the secondary elements disclosed herein. In addition, also further dental implants and secondary elements not shown and/or discussed herein are envisaged as being part of the present disclosure to the extent that they have stabilizing sections and/or indexing sections and/or drive and indexing sections as discussed herein. Similar considerations apply to the combinations of dental implants and insertion tools (which are not shown and/or discussed) with the specification that the drive section of the insertion tool must be provided with the "modified torx" configuration of the present invention.

Where technical features mentioned in any claim are followed by reference signs, those reference signs have been included for the sole purpose of increasing intelligibility of the claims and accordingly, such reference signs do not have any limiting effect on the scope of each element identified by way of example by such reference signs.

LIST OF REFERENCE SIGNS USED IN THE DESCRIPTION

A Axis of the dental implant, the secondary part, the insertion tool, the threadable secondary part, and the healing cap
1, 1' Dental implant
11 Coronal section of the dental implant
12 Smooth section of the coronal section of the dental implant
121 Beveled part of the smooth section
122 Shoulder defining the coronal end of the dental implant
13 Threaded section of the coronal section of the dental implant
14 Threaded region of the dental implant
141, 141' Flutes of the threaded region of the dental implant
142 Thread of the threaded region of the dental implant
15 Apical tip of the dental implant
16 Stabilizing section of the internal blind bore of the dental implant
17 Drive and indexing section of the internal blind bore of the dental implant
171 Connecting lobes of the drive and indexing section of the dental implant
172 Lobe linking areas interconnecting the lobes of the drive and indexing section
173 Apical portion of the lobe linking areas
1731 Lateral surface of the apical portion of the lobe linking areas
1732 Ledge of the apical portion
174 Convex section of a lobe linking area
175 Concave section of a lobe linking area
C Extension of the concave section of the lobe linking area into the implant
176 Undercut
177 Circular platform at the coronal end of the drive and indexing section
18 Apical internally threaded section of the internal blind bore of the dental implant
181 Coronal platform of the apical internally threaded section
182 Internal thread of the apical internally threaded section
183 Apical end of the apical internally threaded section
2 Secondary part
21 Coronal section of the secondary part
211 Central through bore of the coronal section of the secondary part
212 Means for rotationally positioning a dental crown or a dental bridge
213, 213' Supporting ledge of the coronal section of the secondary part
22 Stabilizing section of the secondary part
221, 221' Coronal part of the stabilizing section of the secondary part
222 Apical part of the stabilizing section of the secondary part
223 Beveled surface at the interface between the coronal and apical parts of the stabilizing section of the secondary part
224 O-ring at the apical end of the stabilizing section of the secondary part
225, 225' O-ring in the stabilizing section of the secondary part
23 Indexing section of the secondary part
271 Connecting lobes of the indexing section of the secondary part
272 Lobe linking areas of the indexing section of the secondary part
274 Concave section of a lobe linking area of the indexing section of the secondary part
275 Convex section of a lobe linking area of the indexing section of the secondary part
24 Truncated cone-shaped internal section of the secondary part
3 Connection screw
31 Enlarged head of the connection screw
32 Wrench engaging means
4 Insertion tool
41 Coronal section of the insertion tool
411 Shank portion of the coronal section of the insertion tool
412 Manual tool engagement section 412 of the coronal section of the insertion tool
413 Recesses of the manual tool engagement section
414 Engagement element of the shank portion for the connection to a rotary machine
42 Apical section of the insertion tool
421 First stabilizing section of the apical section of the insertion tool
422 Drive section of the apical section of the insertion tool
4221 Coronal part of the drive section of the insertion tool
4222 Apical part of the drive section of the insertion tool
423 Second stabilizing section of the apical section of the insertion tool
471 Connecting lobes of the drive section of the insertion tool
472 Lobe linking areas of the drive section of the insertion tool
488 Circular recess of the drive section of the apical section of the insertion tool
489 O-ring or C-ring of the drive section of the apical section of the insertion tool
5 Threadable secondary part
51 Internal thread of the threadable secondary part
52 Internal beveled surface of the threadable secondary part
53 Coronal cylindrical section of the threadable secondary part
54 Beveled truncated cone-shaped section of the threadable secondary part
55 Apical cylindrical section of the threadable secondary part
6 Healing cap
61 Wrench engaging means of the healing cap
62 Enlarged head of the healing cap
63 Stabilizing section of the healing cap
64 Intermediate section of the healing cap
65 Threaded section of the healing cap
66 Internal beveled surface of the healing cap

The invention claimed is:
1. A dental implant having a substantially cylindrical shape with a longitudinal axis defining a longitudinal direction, the dental implant including:
 a coronal section including a coronal end of the dental implant;
 a threaded region extending apically from the coronal section to an apical tip of the dental implant; and
 an internal blind bore for connection to a secondary part, the internal blind bore including:
  a stabilizing section which extends apically from the coronal end of the dental implant, and a drive and indexing section which extends apically from an apical end of the stabilizing section, wherein the drive and indexing section includes a plurality of connecting lobes having a concave shape and extending in the longitudinal direction, the connecting lobes being interconnected by respective lobe linking areas also extending in the longitudinal direction, each of the lobe linking areas including: two convex sections extending in the longitudinal direction and adjacent to a respective connecting lobe; and a concave section extending in the longitudinal direction and positioned between the two convex sections, and wherein the concave section of each of the lobe linking areas is shaped so as to extend along a lateral face of a first straight cylinder having a center coincident with the longitudinal axis of the dental implant, and a diameter of the first straight cylinder is smaller than a diameter of a second straight cylinder that has: (i) a lateral face intersecting a radial outer limit of each of the connecting lobes along one line only extending in the longitudinal direction of the dental implant and (ii) a center coincident with the longitudinal axis of the dental implant.

2. The dental implant of claim 1, wherein the internal blind bore further includes an apical internally threaded section extending apically from an apical end of the drive and indexing section.

3. The dental implant of claim 2, wherein an undercut is provided between the apical end of the drive and indexing section and a coronal platform of the apical internally threaded section.

4. The dental implant of claim 3, wherein the coronal platform extends on a plane that is perpendicular to the axis of the dental implant.

5. The dental implant of claim 1, wherein both the connecting lobes and the lobe linking areas extend substantially along the entire axial extension of the drive and indexing section.

6. The dental implant of claim 1, wherein the lobe linking areas each include an apical portion which has a step configuration.

7. The dental implant of claim 6, wherein each apical portion has a lateral surface which is part of a lateral cylinder surface having an axis that is coincident with the axis of the dental implant, wherein each lateral surface is provided with a ledge which extends in a radial direction towards the axis of the dental implant.

8. The dental implant of claim 7, wherein each ledge extends in a radial direction that is substantially perpendicular to the axis of the dental implant.

9. The dental implant of claim 7, wherein each ledge extends in a radial direction that is apically inclined with respect to the axis of the dental implant.

10. The dental implant of claim 9, wherein an undercut extends apically below the ledge of each apical portion of the lobe linking areas up to a coronal platform of an apical internally threaded section of the internal blind bore of the dental implant.

11. The dental implant of claim 6, wherein each apical portion has a lateral surface which is part of a truncated cone surface flaring out coronally and having an axis that is coincident with the axis of the dental implant, wherein each lateral surface is provided with a ledge which extends in a radial direction towards the axis of the dental implant.

12. The dental implant of claim 11, wherein each ledge extends in a radial direction that is substantially perpendicular to the axis of the dental implant.

13. The dental implant of claim 11, wherein each ledge extends in a radial direction that is apically inclined with respect to the axis of the dental implant.

14. The dental implant claim 13, wherein an undercut extends apically below the ledge of each apical portion of the lobe linking areas up to a coronal platform of an apical internally threaded section of the internal blind bore of the dental implant.

15. The dental implant of claim 1, wherein the connecting lobes are shaped as respective half-cylinders with a lateral area that is parallel to the axis of the dental implant.

16. The dental implant of claim 1, wherein the convex and concave sections of the lobe linking areas are shaped as parts of respective cylinders with a lateral area that is parallel to the axis of the dental implant.

17. The dental implant of claim 1, wherein a substantially circular platform is provided at a coronal end of the drive and indexing section which is adjacent to the apical end of the stabilizing section, and wherein the substantially circular platform is formed by radially protruding coronal parts of the lobe linking areas.

18. The dental implant of claim 1, wherein the number of connecting lobes and the number of lobe linking areas is equal to six.

19. The dental implant of claim 1, wherein the stabilizing section is shaped as a truncated cone flaring out in a coronal direction and with a coronal opening having an angle in a range of 5 degrees to 7.9 degrees with respect to the axis of the dental implant.

20. The dental implant of claim 1,
wherein the coronal section includes at an external part thereof a smooth section extending in the apical direction from the coronal end of the dental implant and a threaded section extending in the apical direction from the apical end of the smooth section up to a coronal end of the threaded region, and
wherein the threaded section is adapted for securing a secondary part on the external part of the dental implant and/or wherein the threaded section includes a reverse thread and/or wherein the threaded section is adapted to facilitate osseointegration of the dental implant.

21. The dental implant of claim 20,
wherein the smooth section of the coronal section of the dental implant comprises a beveled part in the vicinity of the coronal end of the dental implant, and
wherein the beveled part is apically inclined at its periphery.

22. The dental implant of claim 21, wherein the beveled part forms an angle in a range of 17 to 27 degrees with respect to a plane that is perpendicular to the axis of the dental implant.

23. The dental implant of claim 21,
wherein the coronal end of the dental implant is defined by a flat shoulder which is adjacent to the beveled part,
wherein the flat shoulder lies on the plane which is perpendicular to the axis of the dental implant,
wherein along a radius extending from the axis of the dental implant the ratios of the radial width of the flat shoulder to the radial width of the projection of the beveled part on the radius are in a range from 1/5 to 1/3.

24. The dental implant of claim 1, wherein an undercut is provided at an apical end of the drive and indexing section.

25. The dental implant of claim 24, wherein the undercut has a reduced extension at the connecting lobes of the drive and indexing section of the dental implant.

26. The dental implant of claim 1, wherein the threaded region includes at least one flute, the at least one flute being configured to mill bone, collect bone, condense bone and disperse bone when the dental implant is rotated both in the clockwise and in the counterclockwise direction and/or wherein the thread of the threaded region of the dental implant has a helical shape.

27. A secondary part for a dental implant, the secondary part having a central bore extending along a longitudinal axis thereof, the longitudinal axis defining a longitudinal direction, the secondary part including:
 a coronal section including a coronal end of the secondary part;
 a stabilizing section extending apically from an apical end of the coronal section; and
 an indexing section extending apically from an apical end of the stabilizing section,
 wherein the indexing section includes a plurality of connecting lobes having a convex shape and extending in the longitudinal direction, the connecting lobes being interconnected by respective lobe linking areas also extending in the longitudinal direction, each of the lobe linking areas including: two concave sections extending in the longitudinal direction and adjacent to a respective connecting lobe; and a convex section extending in the longitudinal direction and positioned between the two concave sections, and
 wherein the convex section of each of the lobe linking areas is shaped so as to extend along a lateral face of a first straight cylinder having a center coincident with the longitudinal axis of the secondary part, and a diameter of the first straight cylinder is smaller than a diameter of a second straight cylinder that has: (i) a lateral face intersecting a radial outer limit of each of the connecting lobes along one line only extending in the longitudinal direction of the secondary part and (ii) a center coincident with the longitudinal axis of the secondary part.

28. The secondary part of claim 27, wherein both the connecting lobes and the lobe linking areas extend substantially along the entire axial extension of the indexing section.

29. The secondary part of claim 27, wherein the connecting lobes are shaped as respective half-cylinders with a lateral area that is parallel to the axis of the secondary part.

30. The secondary part of claim 29, wherein the beveled surface forms an angle in a range of 17 to 27 degrees with respect to a plane that is perpendicular to the axis of the secondary part.

31. The secondary part of claim 27, wherein the concave and convex sections of the lobe linking areas are shaped as parts of respective cylinders with a lateral area that is parallel to the axis of the secondary part.

32. The secondary part of claim 27, wherein the number of connecting lobes and the number of lobe linking areas are equal to six.

33. The secondary part of claim 27, wherein the stabilizing section includes at least one apical part shaped as a truncated cone flaring out in a coronal direction, and wherein a coronal opening of the apical part has an angle in a range of 5 degrees to 7.9 degrees with respect to the axis of the secondary part.

34. The secondary part of claim 33, wherein the stabilizing section further includes a coronal part which also flares out in a coronal direction and which has a larger outward flaring section in comparison to the outward flaring section of the at least one apical part of the stabilizing section to allow the formation of the supporting ledge at the coronal end of the coronal section of the secondary part.

35. The secondary part of claim 27, wherein the coronal section is configured to receive a dental prosthesis thereon.

36. The secondary part of claim 27, wherein at an interface between a coronal part of the stabilizing section and an apical part of the stabilizing section a beveled surface is formed, and wherein the beveled surface is apically inclined towards its periphery.

37. The secondary part of claim 27, wherein the secondary part is an abutment for supporting a single tooth or a dental bridge.

38. An insertion tool for a dental implant, the insertion tool having a longitudinal axis defining a longitudinal direction and including:
 a coronal section having a shank portion for connection to a rotary device; and
 an apical section for the engagement with an internal bore of the dental implant,
 wherein the apical section includes from coronal to apical a first stabilizing section and a drive section,
 wherein the drive section includes a plurality of connecting lobes having a convex shape and extending in the longitudinal direction, the connecting lobes being interconnected by respective lobe linking areas also extending in the longitudinal direction, each of the lobe linking areas including: two concave sections extending in the longitudinal direction and adjacent to a respective connecting lobe; and a convex section extending in the longitudinal direction and positioned between the two concave sections, and
 wherein the convex section of each of the lobe linking areas is shaped so as to extend along a lateral face of a first straight cylinder having a center coincident with the longitudinal axis of the insertion tool, and a diameter of the first straight cylinder is smaller than a diameter of a second straight cylinder that has: (i) a lateral face intersecting a radial outer limit of each of the connecting lobes along one line only extending in the longitudinal direction of the insertion tool and (ii) a center coincident with the longitudinal axis of the insertion tool.

39. A dental implant system including:
 the dental implant as claimed in claim 1; and
 a secondary part having a central bore extending along a longitudinal axis thereof, the longitudinal axis defining a longitudinal direction, the secondary part including:
  a coronal section including a coronal end of the secondary part;
  a stabilizing section extending apically from an apical end of the coronal section; and
  an indexing section extending apically from an apical end of the stabilizing section,
  wherein the indexing section is provided with a plurality of connecting lobes having a convex shape and extending in the longitudinal direction, the connecting lobes being interconnected by respective lobe linking areas also extending in the longitudinal direction, each of the lobe linking areas including: two concave sections extending in the longitudinal direction and adjacent to a respective connecting lobe; and a convex section extending in the longitudinal direction between the two concave sections.

40. A dental implant system including:
 the dental implant as claimed in claim 1;
 a secondary part having a central bore extending along a longitudinal axis thereof, the longitudinal axis defining a longitudinal direction, the secondary part including:

a coronal section including a coronal end of the secondary part;

a stabilizing section extending apically from an apical end of the coronal section; and an indexing section extending apically from an apical end of the stabilizing section, wherein the indexing section includes a plurality of connecting lobes having a convex shape and extending in the longitudinal direction, the connecting lobes being interconnected by respective lobe linking areas also extending in the longitudinal direction, each of the lobe linking areas including: two concave sections extending in the longitudinal direction and adjacent to a respective connecting lobe; and a convex section extending in the longitudinal direction between the two concave sections; and an insertion tool having a longitudinal axis defining a longitudinal direction and including:

a coronal section having a shank portion for connection to a rotary device; and an apical section for the engagement with an internal bore of the dental implant, wherein the apical section includes from coronal to apical a first stabilizing section and a drive section, and wherein the drive section is provided with a plurality of connecting lobes having a convex shape and extending in the longitudinal direction, the connecting lobes being interconnected by respective lobe linking areas also extending in the longitudinal direction, each of the lobe linking areas substantially having a concave shape.

41. A dental implant system including:

the dental implant as claimed in claim 1; and a threadable secondary part, the threadable secondary part including an internal thread in a section thereof of an axially symmetric shape, such that the threadable secondary part is threadable to the threaded section of the coronal section of the dental implant.

42. The dental implant system of claim 41, wherein the threadable secondary part includes an internal beveled surface having an inclination angle in a range of 17 to 27 degrees with respect to a plane that is perpendicular to a longitudinal axis of the threadable secondary part.

* * * * *